US010121078B2

(12) United States Patent
Guissin et al.

(10) Patent No.: US 10,121,078 B2
(45) Date of Patent: Nov. 6, 2018

(54) METHOD AND SYSTEM FOR DETECTION OF FOREIGN OBJECTS IN MARITIME ENVIRONMENTS

(71) Applicant: ESHEL AVIV LTD., Herzliya (IL)

(72) Inventors: Rami Guissin, Beit Yanai (IL); Eitan Lavi, Hadera (IL); Akiva Stolovich, Ariel (IL); Sharon Bason, Rosh Haayn (IL)

(73) Assignee: ESHEL AVIV LTD., Herzliya (IL)

( * ) Notice: Subject to any disclaimer, the term of this patent is extended or adjusted under 35 U.S.C. 154(b) by 504 days.

(21) Appl. No.: 14/401,180

(22) PCT Filed: May 13, 2013

(86) PCT No.: PCT/IL2013/050416
§ 371 (c)(1),
(2) Date: Nov. 14, 2014

(87) PCT Pub. No.: WO2013/171746
PCT Pub. Date: Nov. 21, 2013

(65) Prior Publication Data
US 2015/0104064 A1    Apr. 16, 2015

(30) Foreign Application Priority Data

May 15, 2012    (IL) .......................... 219795

(51) Int. Cl.
G06T 7/32    (2017.01)
G06K 9/00    (2006.01)
(Continued)

(52) U.S. Cl.
CPC .......... G06K 9/00771 (2013.01); G06T 7/246 (2017.01); G06T 7/32 (2017.01);
(Continued)

(58) Field of Classification Search
CPC .... H04N 19/61; H04N 21/4382; H04N 19/51; H04N 19/63; H04N 5/225; H04N 5/2628;
(Continued)

(56) References Cited

U.S. PATENT DOCUMENTS 6,679,844 B2 *   1/2004  Loftman ............. G01S 7/52033
                                                       600/443
7,657,059 B2 *   2/2010  Olson ........................ G06T 7/20
                                                        382/103
(Continued)

FOREIGN PATENT DOCUMENTS

CN        101976439    2/2011
EP          1859411   11/2010
WO        2009080903    7/2009

OTHER PUBLICATIONS

Bloisi et al., Argos—A Video Surveillance System for Boat Traffic Monitoring in Venice, Nov. 2009 [retrieved Jul. 18, 2017], International Journal of Pattern Recognition and Artificial Intelligence (IJPRAI), vol. 23, No. 7, pp. 1-23. Retrieved from the Internet: https://www.researchgate.net/profile/Domenico_Bloisi/publications/2.*

(Continued)

Primary Examiner — Andrew Moyer
Assistant Examiner — Dennis Rosario
(74) Attorney, Agent, or Firm — AlphaPatent Associates, Ltd; Daniel J. Swirsky

(57) ABSTRACT

The present invention provides techniques for detecting foreign objects in a region of interest in maritime environments. Image data indicative of a sequence of successively acquired images of the region of interest, is analyzed to determine candidate points of interest, and data indicative of said points is processed to identify candidate points that are adjacently accumulated in different locations in images data. Grouping data may be then generated based on the identified (Continued)

accumulations of candidate points indicative of a group of said candidate points. The grouping data is processed to identify spatio-temporal correlation between the points in the group and determine a corresponding track function, thereby enabling detection of a presence of a foreign object in the image data.

11 Claims, 19 Drawing Sheets

(51) Int. Cl.
    *G08G 3/02*     (2006.01)
    *G06T 7/246*     (2017.01)

(52) U.S. Cl.
    CPC ...... *G08G 3/02* (2013.01); *G06T 2207/10016* (2013.01); *G06T 2207/10048* (2013.01); *G06T 2207/20016* (2013.01); *G06T 2207/30232* (2013.01)

(58) Field of Classification Search
    CPC .. H04N 1/2112; H04N 19/573; H04N 13/383; G06T 2207/20016; G06T 2207/10016; G06T 7/20; G06T 7/277; G06T 5/50; G06T 7/32
    See application file for complete search history.

(56) References Cited

U.S. PATENT DOCUMENTS

| | | | | |
|---|---|---|---|---|
| 8,073,197 | B2* | 12/2011 | Xu | G06K 9/00771 348/169 |
| 8,295,629 | B2* | 10/2012 | Wey | G06T 5/50 348/229.1 |
| 8,411,963 | B2* | 4/2013 | Luff | G06K 9/00771 382/103 |
| 9,001,070 | B2* | 4/2015 | Worfolk | G06F 3/044 178/18.01 |
| 9,135,503 | B2* | 9/2015 | Sundaresan | G06F 3/017 |
| 9,430,923 | B2* | 8/2016 | Kniffen | G08B 13/194 |
| 2010/0124274 | A1 | 5/2010 | Cheok et al. | |

OTHER PUBLICATIONS

Fefilatyev et al., Autonomous Buoy Platform for Low-Cost Visual Maritime Surveillance: Design and Initial Deployment, Apr. 13, 2009 [retrieved Jul. 18, 2017], Proc. SPIE 7317, Ocean Sensing and Monitoring, vol. 7317, pp. 1-12. Retrieved from the Internet: http://proceedings.spiedigitallibrary.org/proceeding.aspx?articleid=1338507.*

Fefilatyev, Detection of marine vehicles in image and video of open sea, 2008 [retrieved Jul. 18, 2017], Graduate Theses and Dissertations, 72 total pages. Retrieved from the Internet: http://scholarcommons.usf.edu/etd/234/.*

Yonovitz, Tunable wavelet target extraction preprocessor, May 7, 2007 [retri Mar. 6, 2018], Proc of SPIE: Acquisition, Tracking, Pointing, and Laser Systems Technologies XXI, vol. 6569, 13 pages. Retr: https://www.spiedigitallibrary.org/conference-proceedings-of-spie/6569/65690A/Tunable-wavelet-target-extraction-preprocessor/10.1117/12.718584.full.*

Danahy, et al., Algorithms for the resizing of binary and grayscale images using a logical transform, Proceeding of SPIE, 2007, vol. 6497, 6497-6506.

Woods, eta l., EM-Based Simultaneous Registration, Restoration, and Interpolation of Super-resolved Images, Image Processing, 2003, ICIP 2003 International Conference, vol. 2, pp. II-303-II-306.

* cited by examiner

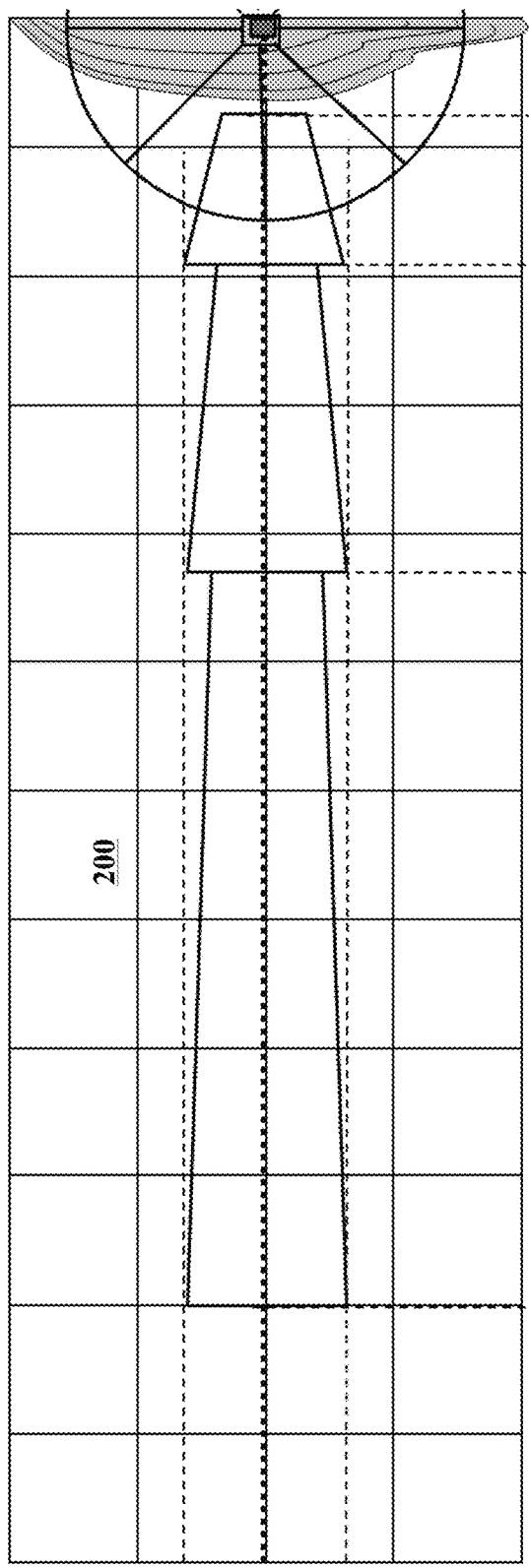
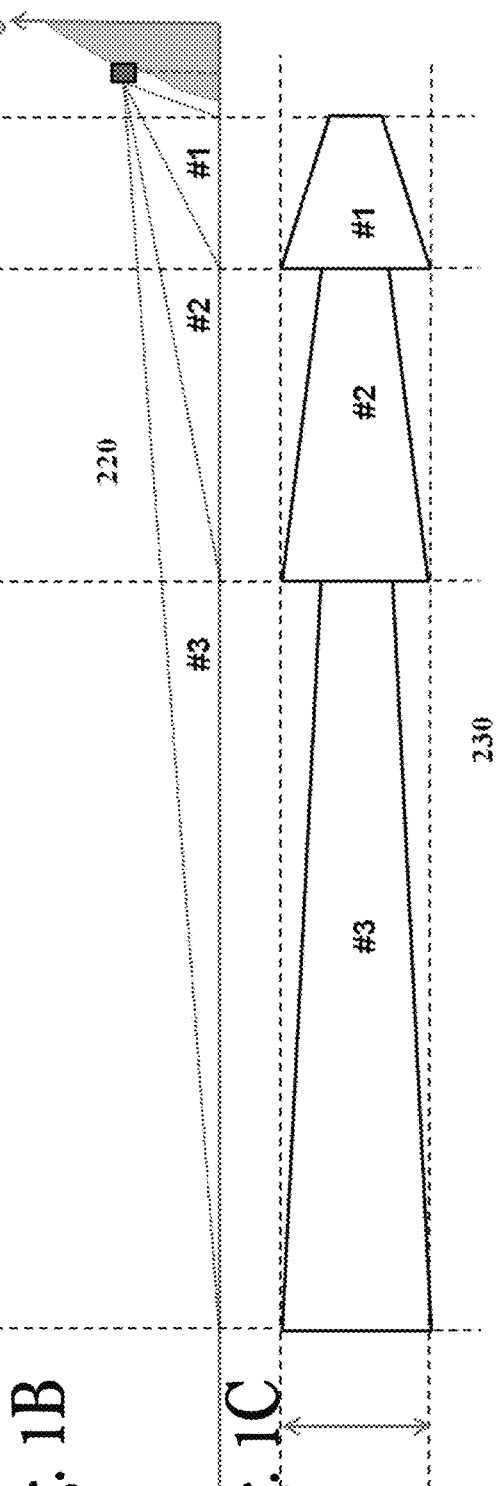
Fig. 1B
Fig. 1C

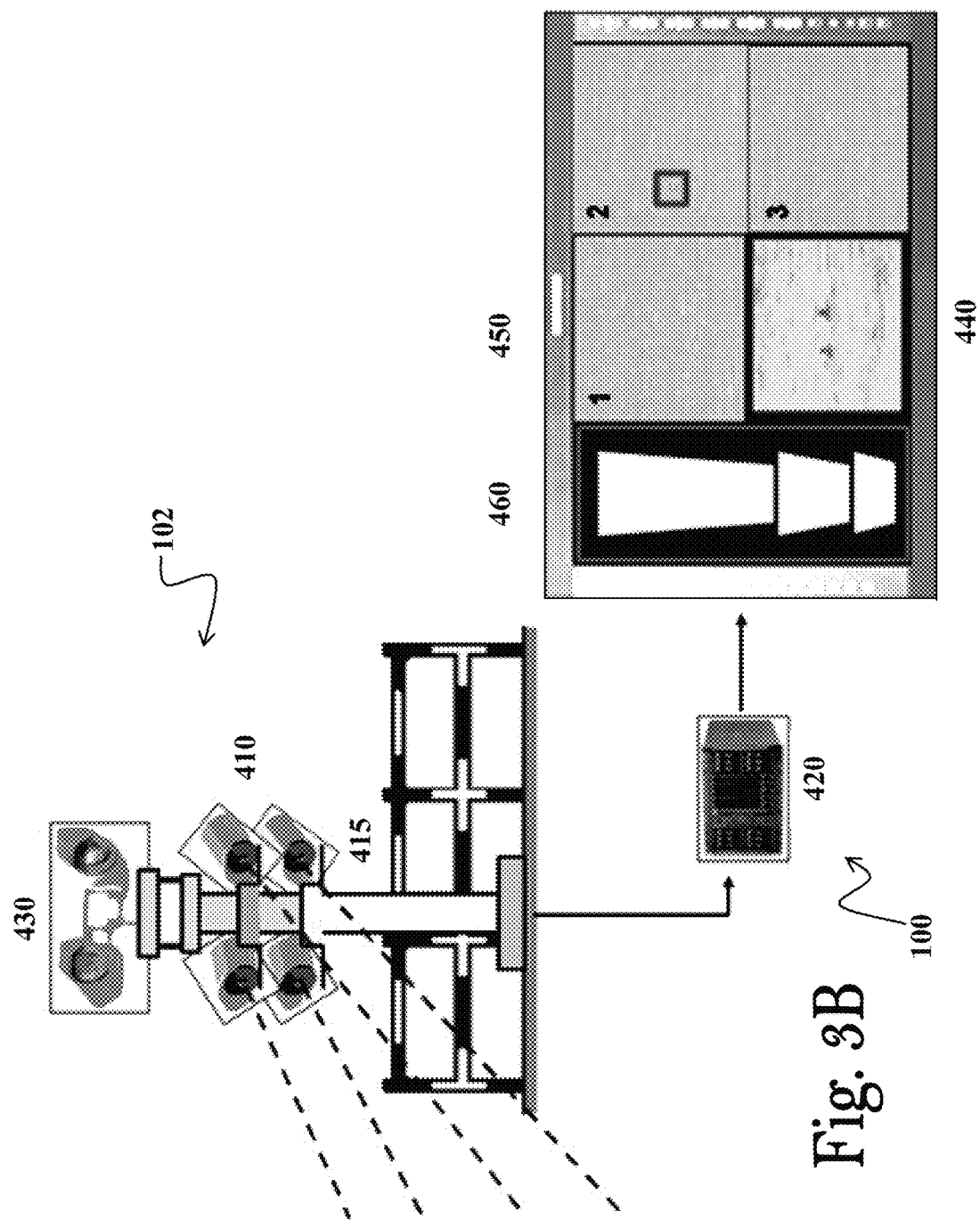

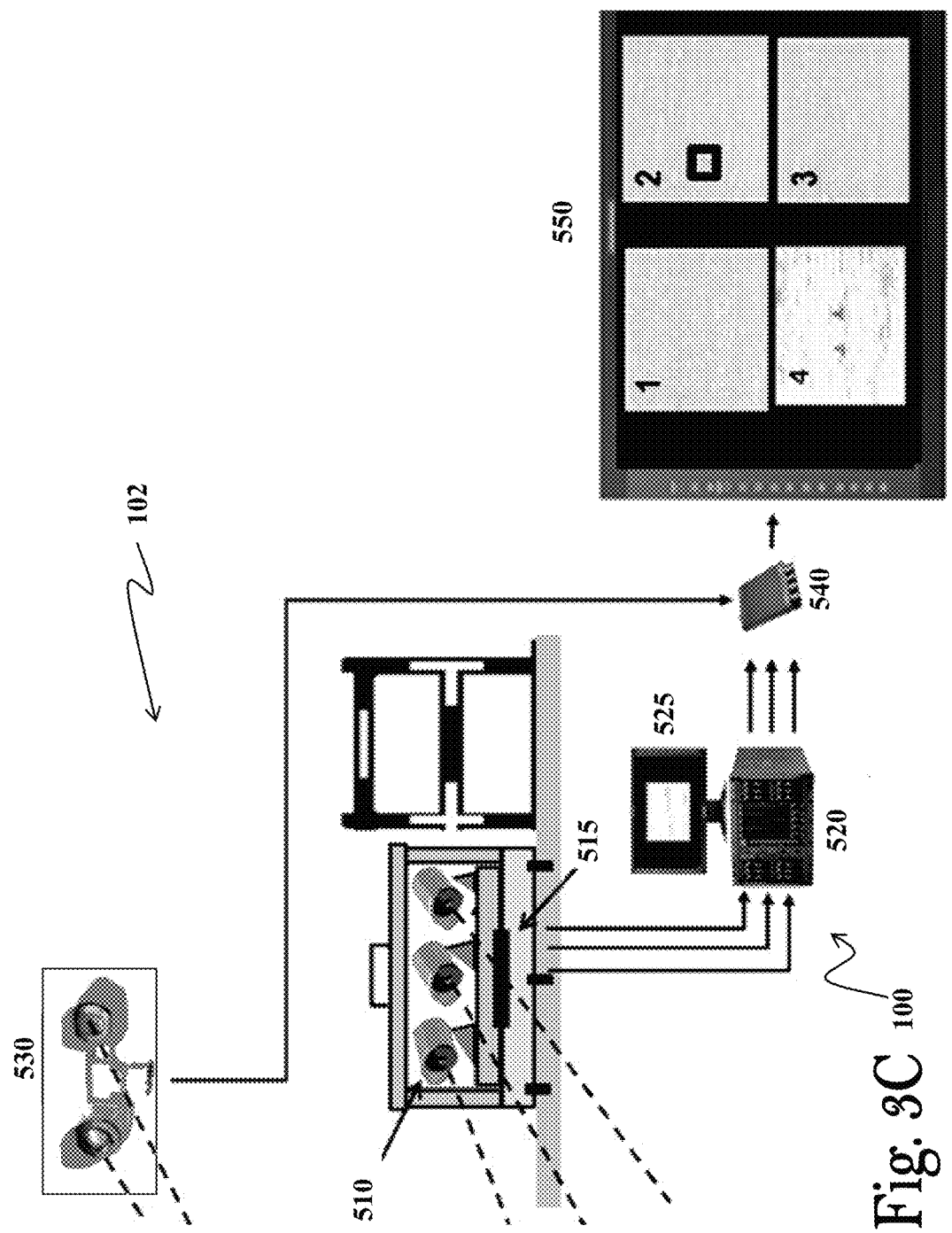

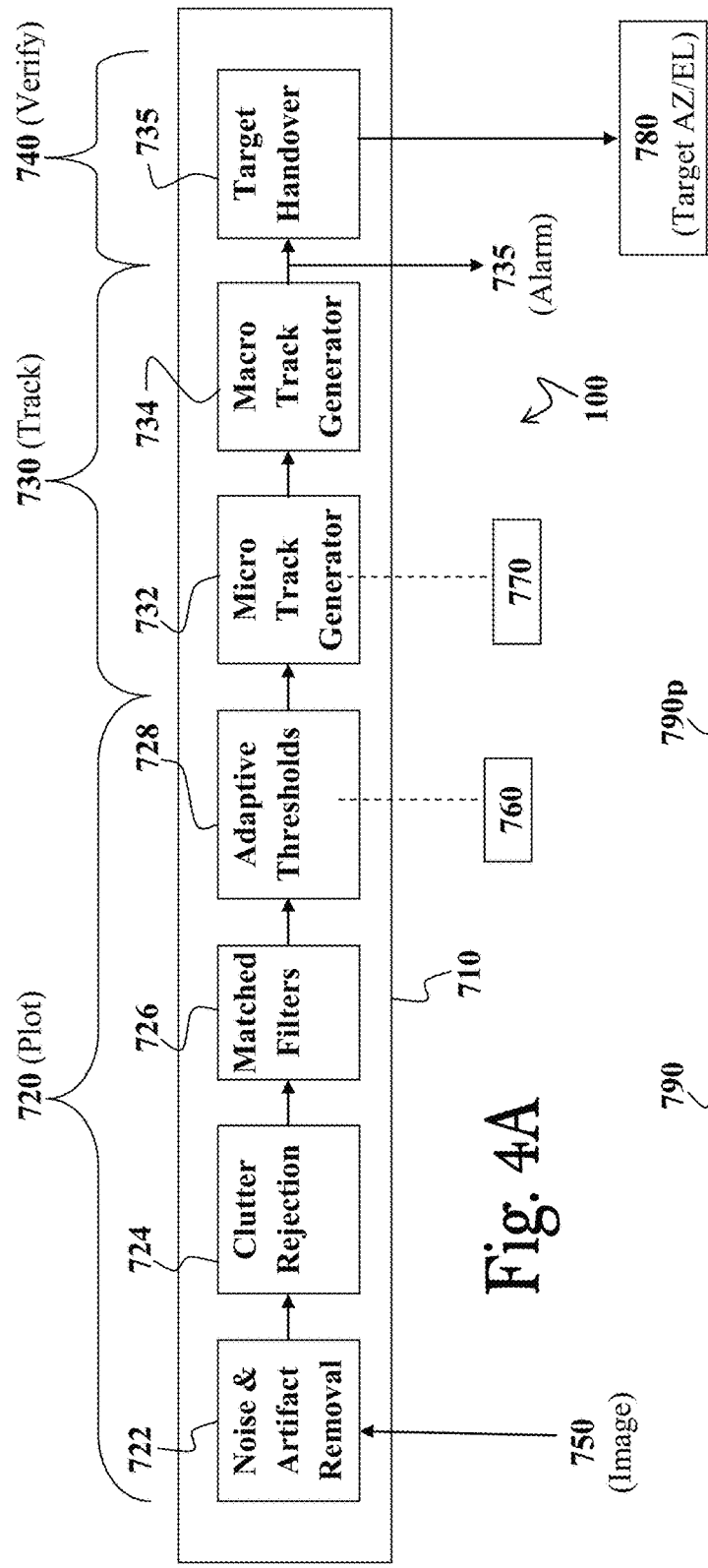
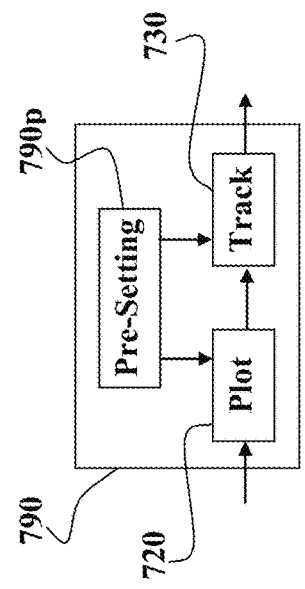
Fig. 4A
Fig. 4B

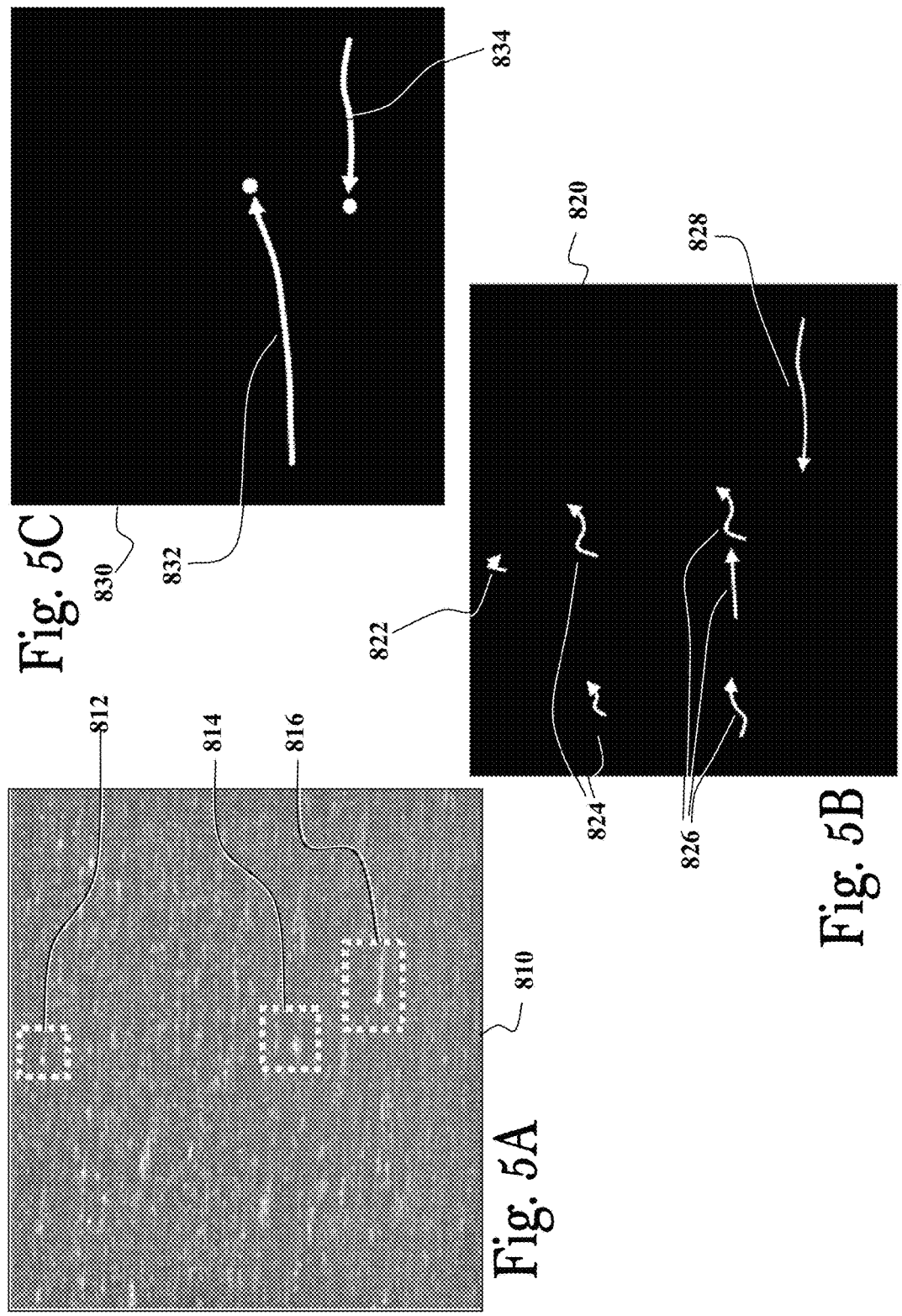

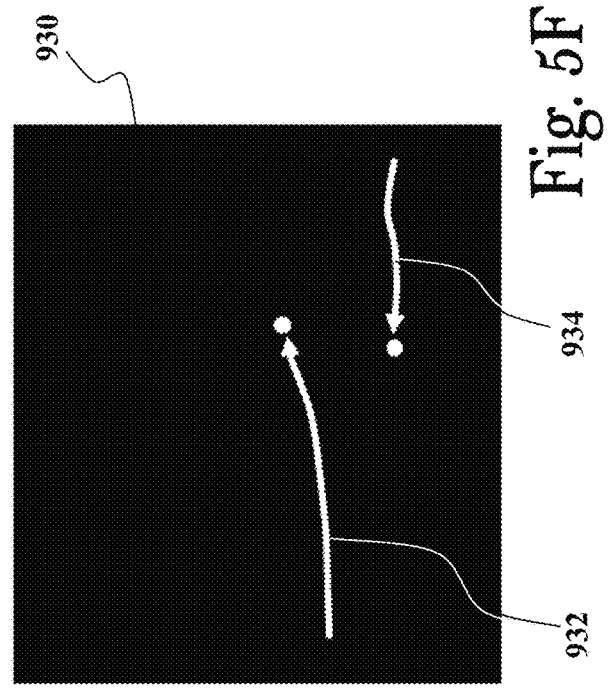
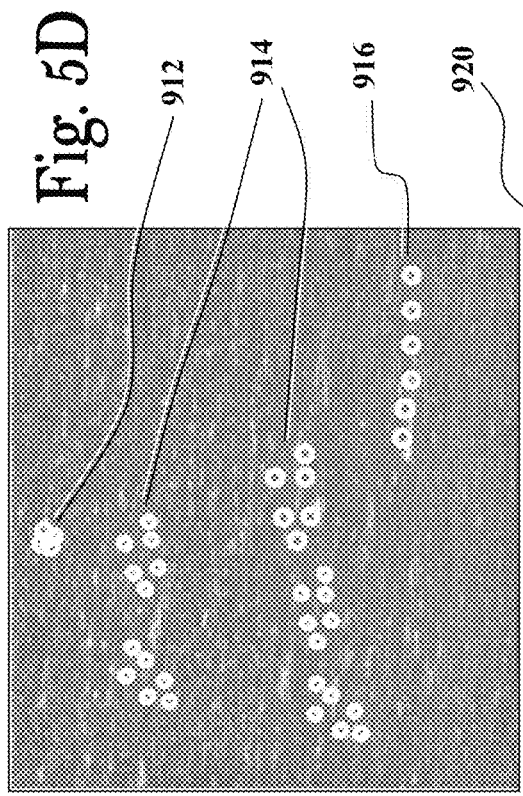
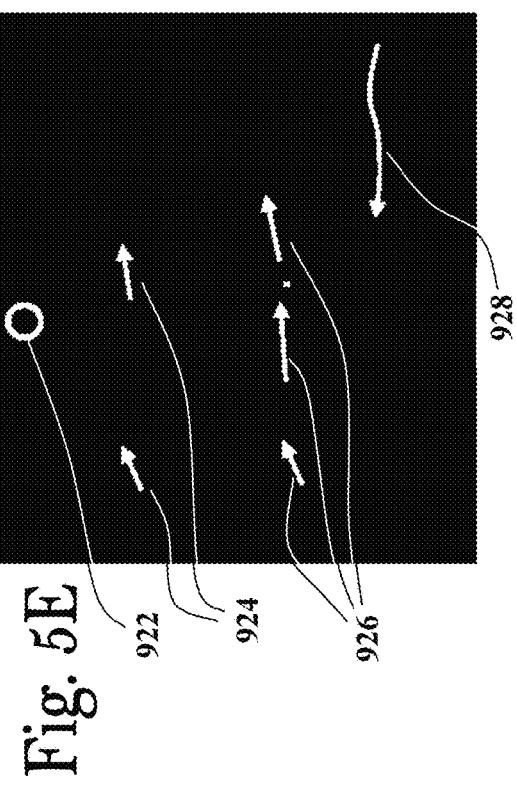

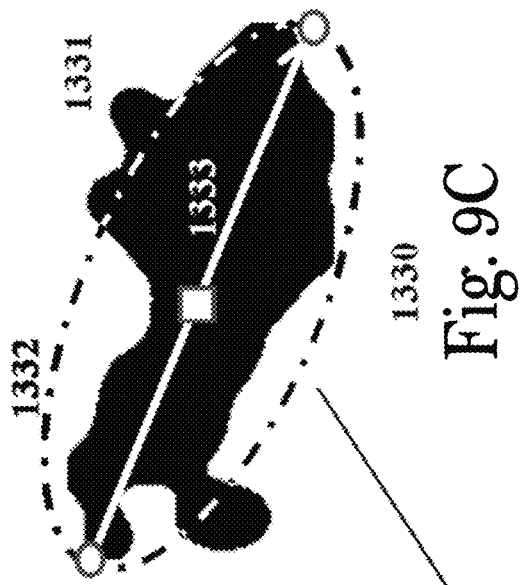
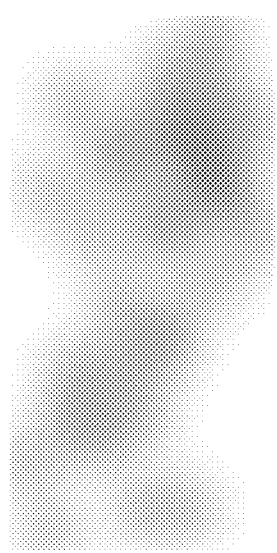
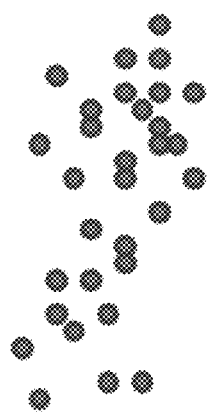
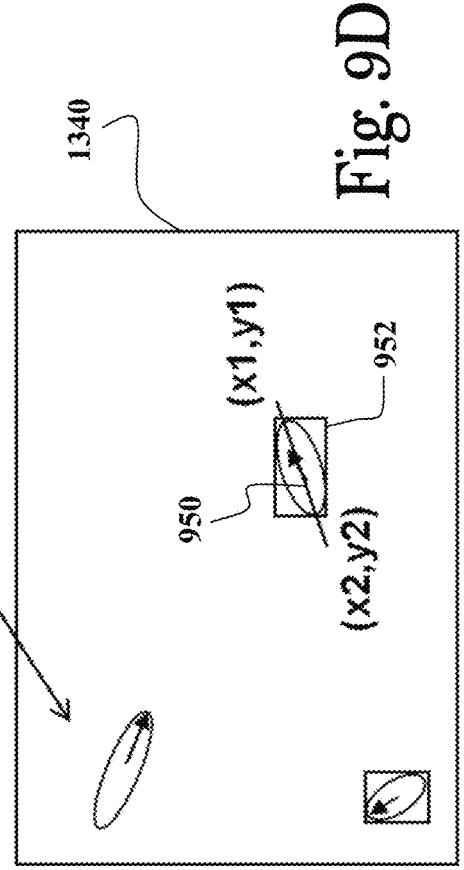
Fig. 9A
Fig. 9B
Fig. 9C
Fig. 9D

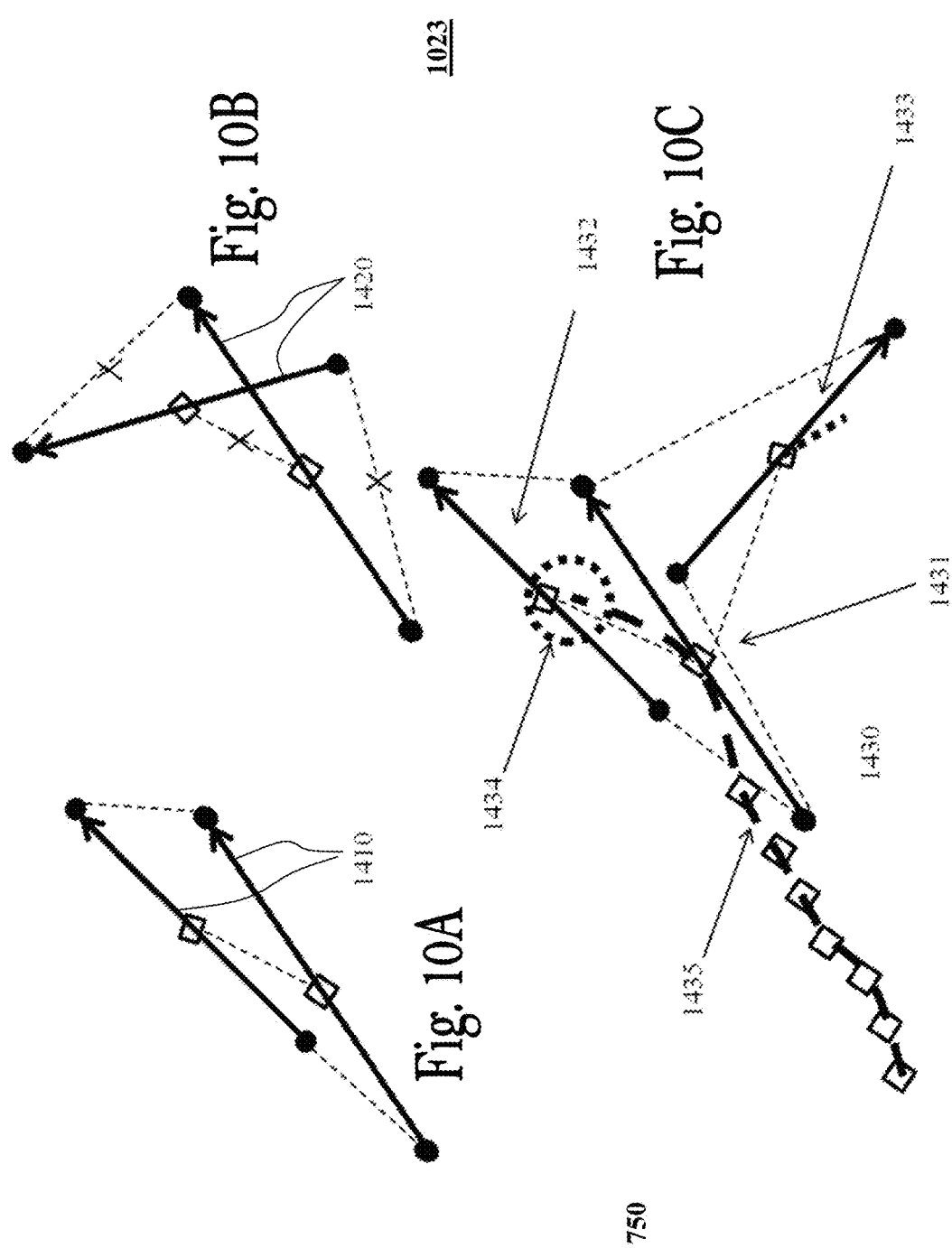

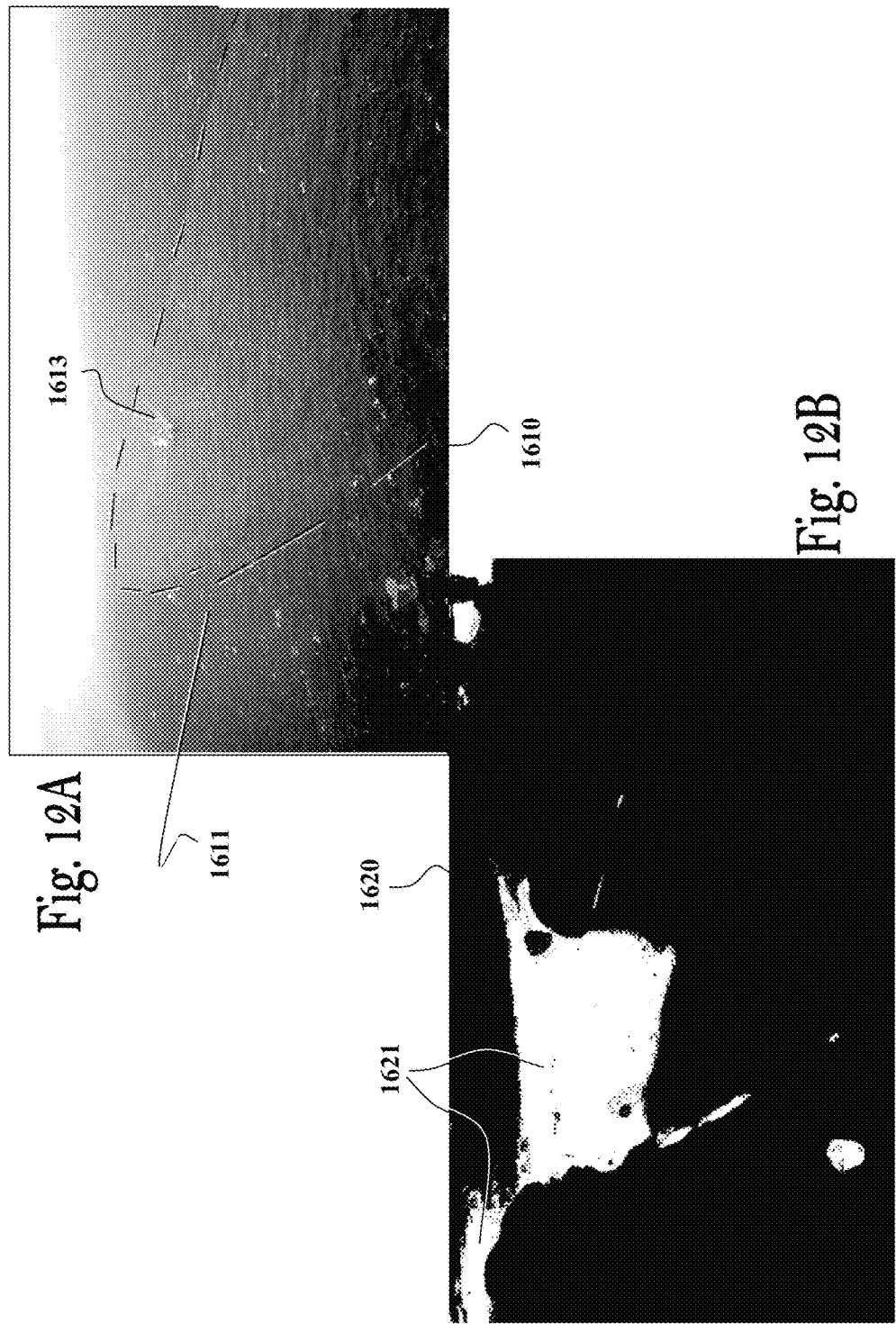

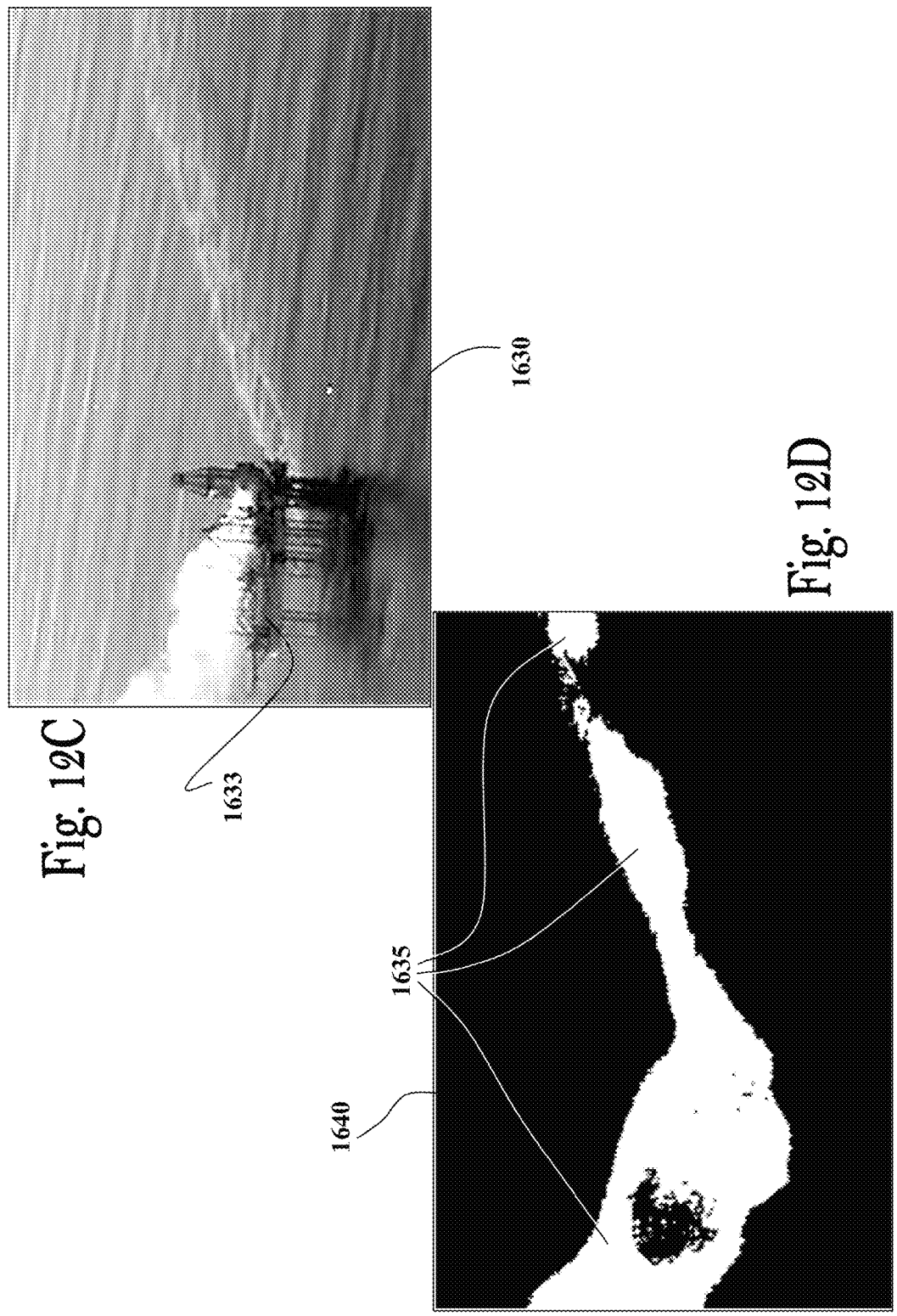

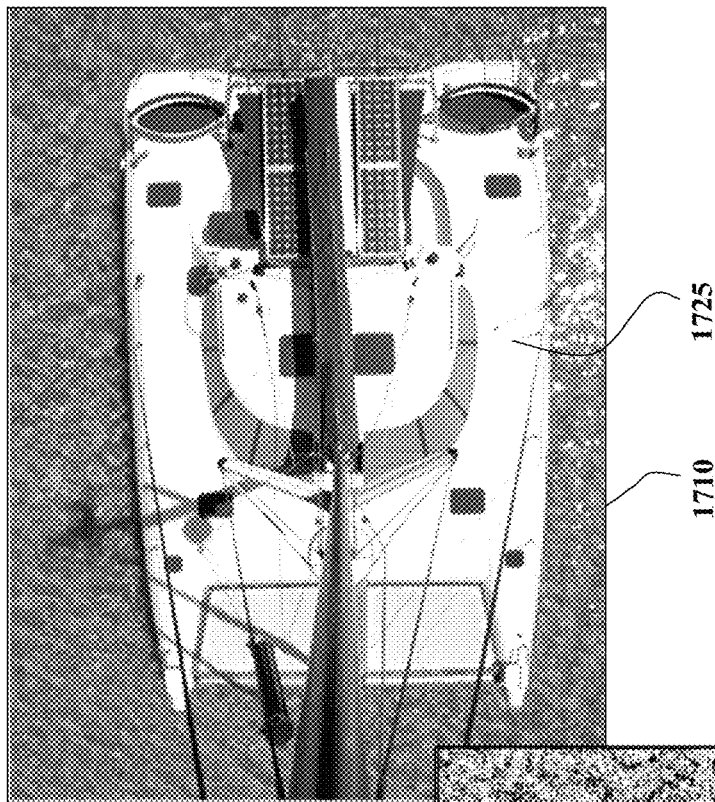
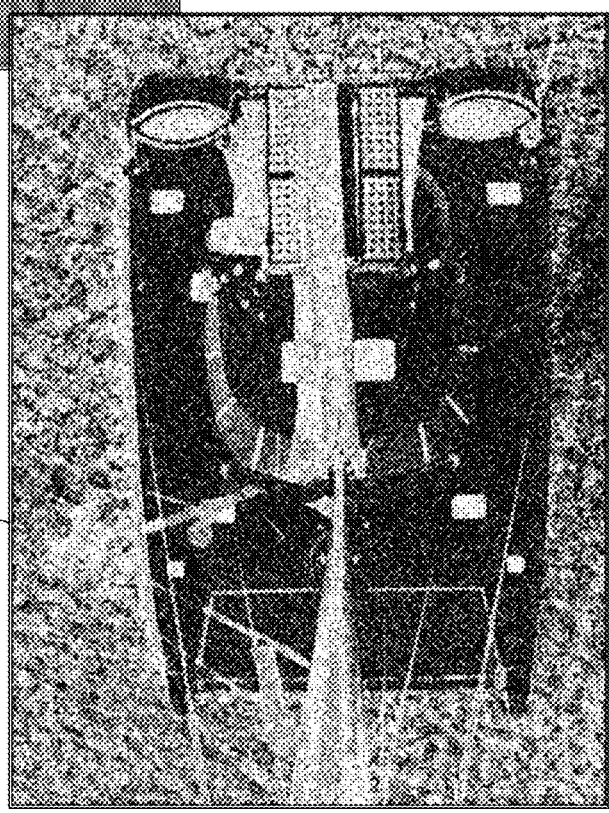
Fig. 13A
Fig. 13B

METHOD AND SYSTEM FOR DETECTION OF FOREIGN OBJECTS IN MARITIME ENVIRONMENTS

TECHNOLOGICAL FIELD

This invention is generally in the field of computer aided imaging techniques for automatic or semi-automatic detection of objects/events, and relates to a method and system for detection of foreign objects in maritime environments.

BACKGROUND

In typical computer aided imaging techniques, an image of a region or scene is produced and processed in order to analyze it and extract desired data therefrom.

In maritime applications, for example, various imagers are used to survey and monitor maritime scenes (e.g., oceans, seas, rivers, lakes, dams, beaches, borders etc), whereby such surveillance and monitoring may include automatic or semi-automatic (man-in-the-loop, i.e., requiring user intervention/aid) detection of foreign objects in the water. Such detection of foreign objects may include, for example, debris, wreckage, buoys, objects, oil leaks, pollution, swimmers, intruders, mines, boats, rigs etc, and is applicable for example in maritime security, navigation, environmental control and rescue operations.

Various object/event detection techniques have been developed for operating in maritime environments.

For example, CN 101976439 discloses a visual attention model with combination of motion information, which is applied in a visual system of a maritime search and rescue machine. This technique mainly utilizes the characteristics in three aspects of brightness, color and the motion information in image sequence during the implementation, utilizes linear combination strategy for forming a visual saliency map, and obtains the current visual attention focus through competition mechanism to carry out object detection for maritime search and rescue. The motion information is derived from the differentiation result between a current frame of the image sequence and a background image after moving average. The use of the visual attention model can generate a search and rescue object saliency map under the maritime search and rescue dynamic background conditions, and further obtain the visual attention focus. The visual attention model uses a small calculation quantity of the motion information and is convenient to realize. Simultaneously, the method does not need to calculate the directional feature in the traditional visual attention model and can effectively remove the interference caused by a water-sky-line and lead the visual attention model to be more applicable to particular maritime search and rescue environments.

WO 09080903 describes a maritime monitoring system, which comprises a radar connected to calculation means and man-machine interfaces making it possible to view on a screen representing a monitored stretch of water the position of the object or objects detected by the radar. It furthermore comprises a panoramic infrared camera adapted for detecting at least one object on at least a part of the monitored stretch of water and for providing the calculation means with a position of each object relative to said camera, and such that the calculation means are adapted for providing the position of each object detected by the radar and of each object detected by the infrared camera in a common reference frame.

GENERAL DESCRIPTION

There is a need in the art for a novel technique for objects/events detection in maritime environments. Imaging-based detection in maritime scenes is challenging due to the cluttered nature of marine backgrounds e.g., waves, ripples, wakes, solar reflections, solar glint, and the like. Moreover, extreme environmental, atmospherics and solar effects pose significant challenges to both the used imagers and the detection processing in terms of noise, clutter, occlusions, dynamic range, dynamic motion etc.

According to one aspect of the invention, there is provided a method for detecting foreign objects in a sequence/stream of images/frames acquired from a region of interest in maritime environment. The method comprises receiving image data indicative of a sequence of successively acquired images of the region of interest, analyzing each image in the sequence of successively acquired images to determine candidate points of interest therein (according to predetermined features/parameters), and generating data indicative thereof, processing the data indicative of the candidate points in the image data, and identifying the candidate points adjacently accumulated in different locations in two or more of the consecutive images, and generating grouping data indicative of groups of such candidate points.

The grouped points are similar points that have different locations in different images, which is indicative of a movement of the respective point. In other words, the grouped points are the candidate points adjacently accumulated in regions of two or more consecutive images of the sequence of images. This information is further processed to identify spatio-temporal correlation or possible path formation between the grouped points for determining presence of a foreign object. For example, determination of the spatio-temporal correlation may comprise identifying two or more of the groups of points for which locations of the points in the images is indicative of a substantially continuous path.

The grouping data may be processed to identify spatio-temporal correlation between the points in the group, and thereby to allow determining a corresponding track function thereby enabling detection of a presence of a foreign object.

The step of analyzing of each of the images may include filtering and thresholding the image. For example, the filtering may include one or more of the following filtering techniques: noise removal; removal of artifacts; and matched filtering.

For example, the method may comprise analyzing a sequence of images acquired from the region of interest, applying to each analyzed image one or more decimation function and generating respective decimated image data, computing signal to clutter ratio for each pixel in said analyzed image and for each pixel in said decimated image data, processing the generated signal to clutter ratios and generating therefrom one or more respective binary image data for said analyzed image and for said respective decimated image data according to a thresholding criterion, interpolating binary image data associated with said decimated image data, and generating data indicative of interpolated image data.

The generation of the data indicative of the interpolated image data may comprise applying an OR logic function to the binary image data obtained for the analyzed image and for the interpolated binary images associated with decimated image data. Optionally, the generation of the decimated image data comprises applying to each image two or more of the decimation functions having different decimation factors, the decimated image data thereby comprising two or more respective decimated image data pieces.

The method may comprise applying the following operations: spatial blobbing (function) the data indicative of the interpolated image data, to thereby obtain segmented blob maps comprising blob data associated with points appearing in the image; filtering the segmented blob maps and generating respective spatiotemporal geometric centers for each blob in said maps, where said geometric centers corresponding to the candidate points; and generating binary images indicative of the spatiotemporal geometric centers. These operations may be applied to the binary image data associated with the analyzed image and with the interpolated image data resulting from said interpolation of the binary images associated with said decimated image data, or to the data resulting from the application of the OR logic function.

In some possible embodiments the detecting of groups of points includes determining an area (region) in the images encompassing a majority of the points of the potential group. The determined encompassing area may be then used to determine orientation/path formed by the locations of the grouped points in the images. Preferably, the determined orientation may be used in identifying formation of a continuous path by indentifying two or more of the points of the group for which the determined orientation is indicative of a possible continuous path. Such grouping and determination of the path formation actually present determination of a track function.

The track function may be defined to overcome the spatiotemporal statistical behavior of the waves, currents and ripples, which may obscure intermittently small objects (e.g., swimmers, buoys) in the water or whereby such objects occasionally sink below the water surface before rising again to the surface. To this end, two levels of tracks may be generated: i) short term (micro) tracks; and ii) long term (macro) tracks. Micro tracks comprise spatiotemporally associated plot detections (e.g., determined from the grouped points) and represent object tracks that were continuously visible for a short time period, for example, for the duration of a part or whole of the lifetime of a wave (in cases in which waves intermittently obscure the objects). Macro tracks spatiotemporally associate between short term micro tracks in overcoming such stochastic behavior of the changing maritime background, as well as objects being intermittently obscured by occasionally sinking below the water surface.

For example, in some embodiments the micro tracks are generated by carrying out the following operations: identifying the groups of adjacently located spatiotemporal geometric centers; applying a smoothing function to the groups of adjacently located spatiotemporal geometric centers and morphological operators to generate respective blobs; and mapping each blob to an oriented ellipse and determining slope and length of an elongated axis thereof and generating micro track data accordingly. The micro track data obtained for the different blobs may be correlated to determine formation of continuous paths and generating macro track data indicative thereof.

The method may comprise analyzing at least one of the grouping data and the track data and selectively generating an alert signal upon identifying that the data is indicative of presence of a possible threat. The alert signal may be used for viewing a specific area of the region of interest with a narrower field of view (zoom in), to monitor presence of foreign objects and/or possible threats therein. For example, a specific area in the region of interest may be determined responsive to the alert signal according to at least one of the grouping data and the track data, and thereafter, one or more images may be acquired from the determined specific area and displayed to a user, and/or automatically processed and analyzed, for monitoring.

In another aspect of the present disclosure, there is provided a system for use in detecting foreign objects in a region of interest in maritime environment, the system comprising a filtering arrangement for filtering out disturbances from the images, image processing unit for identifying candidate points of interest in the filtered images, a spatio-temporal correlation unit for identifying groups of such candidate points which are adjacently located in regions of two or more consecutive images of the sequence of images, and a decision making unit for determining presence of a foreign object based on spatio-temporal correlation or possible path formation between such groups of points.

In another aspect, there is provided a computerized system for use in detecting foreign objects in a region of interest in maritime environments. In some embodiments the system comprises a data input utility for receiving image data of two or more images successively acquired from the region of interest, one or more processors and memory configured and operable to receive and analyze the image data using one or more modules stored in the memory.

The modules may comprise a plot detection module for identifying one or more groups of candidate points adjacently accumulated in regions in the two or more images and generating data indicative thereof, and a track detection module for determining correlations between the one or more groups of candidate points for determining formation of continuous paths by the candidate points, and generating track data accordingly. A decision making module may be used for determining presence of a foreign object based on at least one of the groups of candidate points and the generated track data.

In some possible embodiments, the plot detection module comprises a decimation utility for decimating the received image data and generating respective decimated image data, a spatial filter utility for determining a signal to clutter ratio for each pixel in the analyzed image data and for each pixel in the decimated image data, and generating pixel data indicative thereof, a threshold utility for generating binary images for said analyzed image data and said decimated image data based on said pixel data and a thresholding criterion, and an interpolation utility for interpolating binary images associated with said decimated image data. In some embodiments the plot detection module comprises OR function utility for applying an OR logic function to the binary image data associated with the analyzed image data and the interpolated binary images, and generating data indicative thereof.

The plot detection module may also comprises a blob analysis utility for processing the binary image data, or the OR data from the OR logic utility, and generating blob maps comprising blob data associated with points appearing in the received images, a temporal filtering utility for filtering the segmented blob maps and generating respective spatiotemporal geometric centers for each blob in said maps, a summation utility for accumulating geometric centers generated for the received images and generating summation data indicative thereof, and a plot identification utility for identifying the candidate points based on the geometric centers accumulated in said summation data.

In some embodiments the track detection module comprises a micro track detection unit, comprising a blobbing utility for identifying groups of adjacently located candidate points and generating respective blobs to each one of said groups, and a mapping utility for fitting to each blob an oriented ellipse and generating micro track data accordingly. The track detection module may also comprise a macro track detection unit for correlating micro track data obtained for the different blobs to determine formation of continuous paths and generating macro track data indicative thereof.

In light of the above exemplary applications, the subject matter of the present application provides a generalized maritime monitoring method and system enabling detection, tracking and identification of objects of interest in such maritime environments. Such a method may be used to improve the ability of an observer/user to perceive such objects in a maritime scene and to accelerate the observer's perceptual process of detecting, tracking and identifying such objects. Another improvement of such observer-in-the-loop surveillance and monitoring, is in enabling the observer to monitor multiple imaging sectors simultaneously, whereby the automated detection will designate suspect areas in the imagery, which the observer may further investigate, for example by using a high resolution imager.

According to another aspect, there is provided an imaging system for surveillance and monitoring of maritime sectors, the system generally comprising: (a) an imaging arrangement comprising imaging devices (e.g., daylight video cameras—CCD, CMOS, night vision cameras—cooled or uncooled thermal imager, FLIR), (b) an image/video/vision processing unit for detecting and tracking events/foreign objects in the water, which may comprise one or more processing units such as computers, controllers, DSPs, and software modules designed for execution by the processing units, or dedicated hardware modules (e.g., IC, ASIC, FPGA), and (c) a control and display unit comprising a user interface and display monitors. Accordingly, embodiments disclosed herein may be implemented by software modules/programs to be executed by computerized machines, and/or hardware modules and units, or combinations thereof.

In some embodiments the image/video/vision processing unit for detecting and tracking events/foreign objects in the water comprises a plot function and a track function, whereby the plot function detects object candidates and the track function associates such detected candidates into spatiotemporal tracks which are then further analyzed for example by a human observer.

One possible example is a swimmer, who may swim using freestyle stroke or breast stroke. In freestyle strokes, there is generally always a part of the body above the water surface (an arm, head). In breast stroke, the entire body may be immersed under water for one or more consecutive strokes at a time. Therefore, for freestyle stroke swimming a single continuous track may be expected as the object is continuously observed, detected and tracked. Alternatively, for breast stroke swimming with the entire body (including the head) intermittently obscured while under water, a single continuous track cannot be expected as the object is not continuously observed, and micro tracks are computed for each duration in which the swimmer is observed, and as the swimmer proceeds spatially, such micro tracks are then associated spatiotemporally in generating a macro track of each such swimmer.

The performance of detection systems is generally defined by two main parameters. Probability of detection (PD) and probability of false alarm (PFA) (often PFA is replaced by false alarm rate (FAR)). Due to the specific behavior of the maritime backgrounds and the way objects in the water move and become intermittently immersed in water, an additional important parameter plays a role here, the response time (RT) of the system.

Different objects in maritime environments e.g., swimmers, jet skis, vessels, buoys, debris, pollution etc, have different dimensions, contrast (visible, thermal), and velocities. Swimmers are typically characterized by the following: small dimensions, low contrast, low signal to clutter, sporadic obscurations due to waves, immersion in water and slow moving. Larger motorized vessels are typically characterized by the following: larger dimensions, higher contrast, higher signal to clutter, continuously visible due to having larger dimensions than waves, do not go under water, and fast moving. An oil spill may typically have a varying geometry and dimensions, often continuously expanding and drifting, with typically homogeneous contrast in its center and more contrasty along its perimeter.

Therefore, in some possible embodiments different processing schemes (e.g., scripts or threads) are utilized concurrently in parallel for different objects of interest in order to account for such diversity of objects characteristics.

For small objects such as debris and swimmers, as the velocity of the object is relatively low, the RT may be extended in achieving sufficiently high PD and low PFA, while for motorized vessels, as their velocity is higher, the RT may be shortened while still achieving sufficiently high PD and low PFA.

The combined performance of PD, PFA and RT provides flexibility to the maritime detection system, in terms of addressing the different objects of interest and sea conditions, while complying with performance requirements.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 1B and 1C schematically illustrates a virtual fence example for a maritime border in accordance with some possible embodiments, whereby multiple persistent cameras are utilized to generate a virtual fence for detecting intruders and threats crossing such virtual fence and issue a responsive alarm;

FIGS. 3A to 3C exemplify possible implementations of the a surveillance system according to some possible embodiments, demonstrating persistent (day/night) surveillance of multiple maritime sectors utilizing various imagers and split screen displays, reduced operator/crew workload utilizing automated image/video processing for intrusion detection/tracking/alarm of threats, and rapid handover of detected threats to a PTZ imager for visual verification;

FIGS. 4A to 4F exemplify detection and inspection of suspicious objects in a stream of images according to some possible embodiments, utilizing a detect and track processing scheme;

FIG. 5A to 5F exemplify a process of automated image/video processing for intrusion detection/tracking/alarm of threats based on plot, micro track and macro track processing;

FIGS. 9A to 9D schematically illustrate a technique for generating micro tracks according to some embodiments;

FIGS. 10A to 10C demonstrate a method for generating macro tracks according to some possible embodiments;

FIGS. 12A to 12D exemplify detection of oil spillage utilizing an airborne imager; and FIGS. 13A and 13B exemplify a possible embodiment employing a peripheral imager mounted on a mast of a vessel that can provide full peripheral coverage of the vessel from a top view, and its maritime surrounds, thereby enabling detection of overboard objects, debris, protruding fishing net cranes, spillage, wreckage and suchlike.

DETAILED DESCRIPTION OF EMBODIMENTS

Figure 1A:
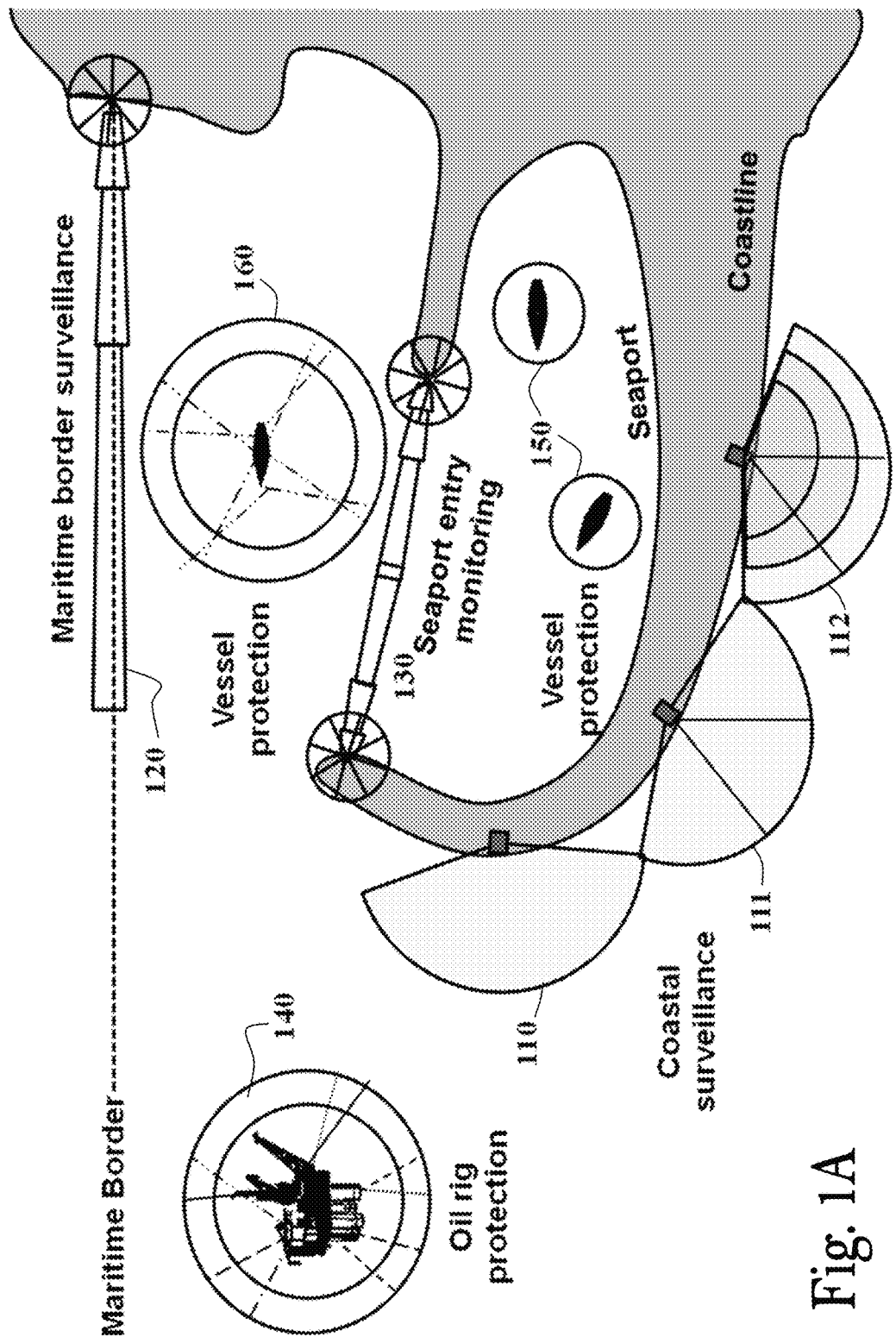
FIG. 1A schematically illustrates multiple waterside security applications in accordance with some possible embodiments, including maritime border surveillance, coastal surveillance, seaport entry monitoring, vessel protection and oil rig protection.

Referring to FIG. 1A, various surveillance systems are schematically illustrated that may utilize the principles of the present invention, as will be described more specifically further below, for use in maritime surveillance applications. Such applications include, for example, maritime border surveillance, coastal surveillance, seaport entry monitoring, vessel protection and oil rig protection. More generally, applications may also include commercial, environmental and maritime safety applications.

A surveillance system 110 exemplifies a wide field of regard (FOR) electro-optic (EO) persistent coastal surveillance and monitoring system usable for maritime monitoring and inspection of region(s) of interest, which may be used in coastlines security applications. System 110 may utilize a wide field of view (FOV) persistent imager, or imaging system, automated image/video processing for intrusion detection/tracking/alarm of threats, and optional rapid handover of detected threats to a pan tilt zoom (PTZ) imager for visual verification.

A surveillance system 111 exemplifies a wide FOR, EO persistent coastal surveillance and monitoring system which is also useful for maritime coastlines security applications. In this example, the surveillance system 111 is based on an arrangement of multiple, small FOV persistent imagers configured to azimuthally cover a wide FOR, automated image/video processing for intrusion detection/tracking/alarm of threats, and optional rapid handover of detected threats to a PTZ imager for visual verification.

A surveillance system 112 exemplifies a wide FOR, EO persistent coastal surveillance and monitoring system which is also useful for maritime coastlines security applications. In this example, the surveillance system 112 is based on an arrangement of multiple, small FOV persistent imagers configured to cover, in both azimuth and elevation, a wide FOR, automated image/video processing for intrusion detection/tracking/alarm of threats, and optional rapid handover of detected threats to a PTZ imager for visual verification.

A surveillance system 120 exemplifies a long and narrow FOR, EO persistent coastal surveillance and monitoring system which is useful for securing maritime borders, for example. In this example, the surveillance system 120 is based on multiple, small FOV persistent imagers covering in elevation a long and narrow FOR, automated image/video processing for detection/tracking/alarm of threats that enter or cross the covered sectors, and optional rapid handover of detected threats to a PTZ imager for visual verification. In addition, in a possible embodiment, a wide FOR surveillance system, such as 111 surveillance system for instance, may be combined with a narrow FOR surveillance system, such as surveillance system 120, to simultaneously cover both the shore range areas (at close ranges) and the long range areas, relative to the surveillance system.

A surveillance system 130 exemplifies a specific embodiment utilizing a long and narrow FOR surveillance system, such as surveillance system 120, or alternatively, two such long and narrow FOR persistent surveillance systems 120, facing each other, thereby providing effectively persistent seaport security by monitoring such seaport entry.

A surveillance system 140 exemplifies a panoramic FOR surveillance and monitoring system applicable for securing stationary maritime infrastructures such as for example drilling rigs, optionally comprising several persistent surveillance overlapping systems 110 and/or 111 and/or 112, allowing monitoring wide and/or narrow FORs (e.g., using wide range coverage imagers, and/or azimuth and/or elevation small FOV coverage imagers).

A surveillance system 150 exemplifies a panoramic FOR surveillance and monitoring system for securing stationary maritime ships at bay, optionally comprising several inertial surveillance overlapping systems, such surveillance systems 110, and/or 111, and/or 112, for example.

A surveillance system 160 exemplifies a panoramic FOR surveillance and monitoring system for securing moving maritime vessels, optionally comprising several inertially compensated or stabilized surveillance overlapping systems, such as surveillance systems 110, and/or 111, and/or 112.

All of the above (units 110, 111, 112, 120, 130, 140, 150, 160) FOR coverage configurations may utilize persistent imaging combined with automated image/video detection processing. Alternatively, a small FOR imager (e.g., PTZ) may be used in step-stare or continuous slew operating modes in covering said wide FOR. In the case of a step-stare mode, after each step (slew or skip) to a next region of interest, the automated image/video detection processing is preferably applied, and provides either an alert of a foreign object in the region of interest, or if no object is detected an automated command is provided to skip to the next region of interest. Such time interval of detection or skip command in each region of interest may be provided automatically by the image/video detection processing, depending on the scene complexity analysis performed by the processing unit. Upon detection, the small FOR PTZ imager may be used to investigate the detected objected by automatically centering and tracking said object hence enabling visual verification, prior to reverting back to persistent detection in said step-stare operating mode. Another alternative is the use of a radar to perform the wide FOR detection, thereby handing over to a small FOR PTZ imager for visual verification while utilizing the automated image/video detection processing for centering and tracking said object while performing visual verification and possible recording of the event.

FIGS. 1B and 1C more specifically illustrate possible coverage 200 in an exemplary embodiment of surveillance system 120, configured as an EO persistent coastal surveillance and monitoring system providing a long and narrow FOR virtual security fence along a maritime border. As shown in the figures, the surveillance system 120 includes three persistent surveillance imagers positioned as indicated by numeral reference 220, for example on a hillside or mast, which have angular FOVs covering respective three longitudinal contiguous sectors 230 of certain linear dimensions and ranges.

Figure 2:
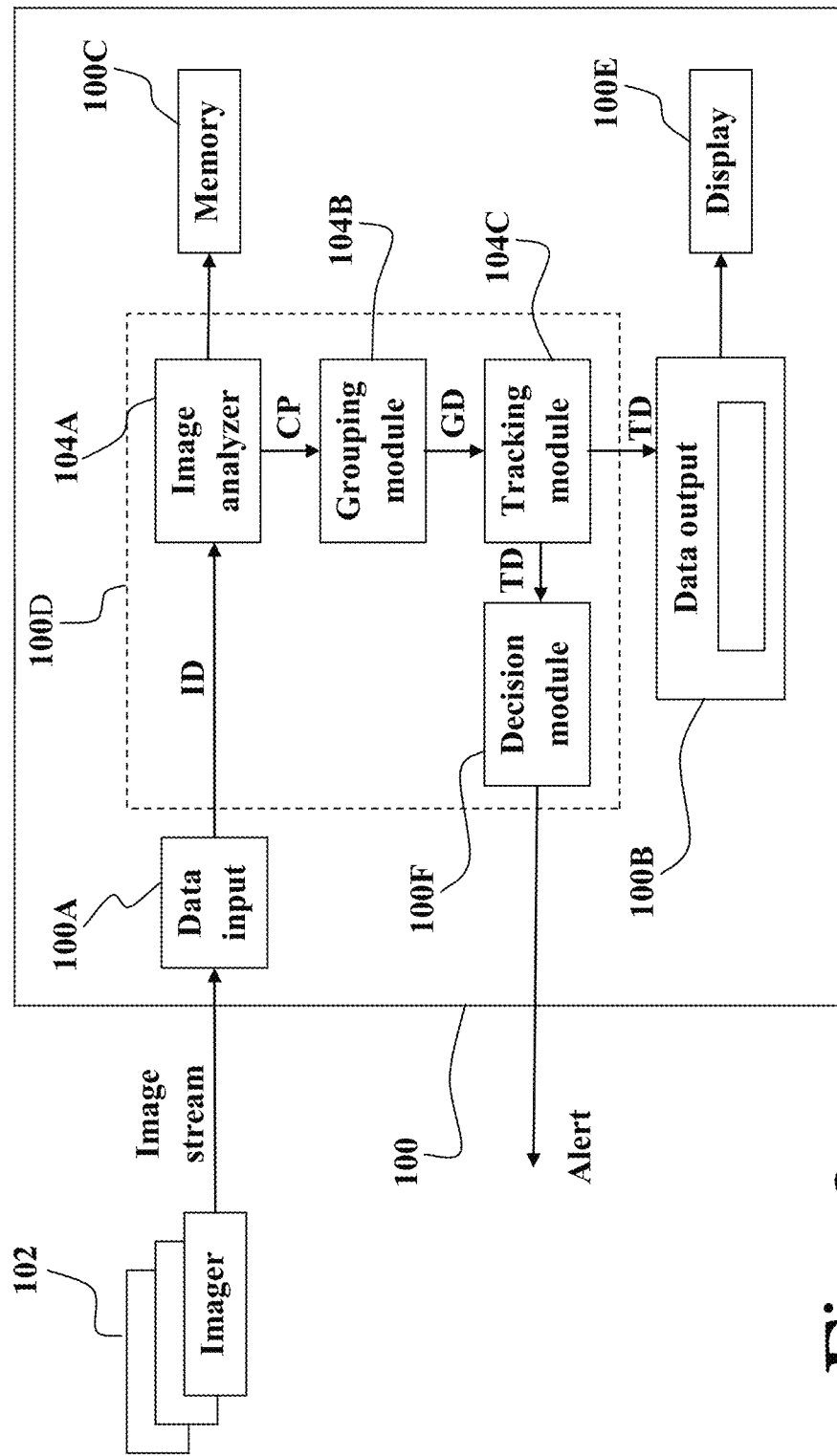
FIG. 2 is a block diagram illustrating a surveillance system according to some possible embodiments.

Reference is made to FIG. 2 showing, by way of block diagrams, the configuration and operation of a surveillance system, generally at 100, of the present invention.

The surveillance system 100 is a computer system including inter alia such utilities as data input/output utilities 100A, 100B, memory 100C, data processor 100D, and possibly a display 100E. The surveillance system 100 is associated with an imaging utility 102. For example, the system 100 may include a frame grabber (constituting an imager) or may be connectable (via wires or wireless signal transmission) to an external imager being constituted by one or more cameras or an image storage utility.

The data input utility 100A may comprise a filtering arrangement (e.g., preprocessing stage) for filtering out disturbances/noise from the received stream of images. The data processor 100D is configured for analyzing image data ID received from the input utility 100A for detecting foreign objects (which term also refers to events) in a region of interest being imaged. The image data ID is indicative of a stream/sequence of successively acquired images/frames of the region of interest, which in this specific application is a region in maritime environments.

The data processor 100D includes an image analyzer 104A configured and operable for analyzing each image in the input sequence of consecutive images and determine candidate points CP of interest therein. To this end, the image analyzer 104A performs pattern recognition algorithm to identify the candidate points CP based on, for example, predetermined features/parameters/thresholds.

Further provided in the data processor 100D is a grouping module 104B (also referred to herein as correlating or grouping unit/utility). This module (e.g., software utility) is configured for receiving the image data ID with the "marked" candidate points CP in each of the successive images where such points have been identified. The grouping module 104B is configured for grouping those of the candidate points CP which are observed in corresponding zones of the region of interest in two or more successive images and in proximally (shifted) locations. Thus, in other words, the points relating to the same group are similar points that have different adjacent locations in different images, which is indicative of a movement of the respective point. It should be understood that adjacency of the locations is predefined according to a certain threshold/condition. The grouping module 104B then generates group data GD, which is further processed by tracking module 104C which is configured and operable to identify spatial correlation or possible path formation between such grouped points and generate track data TD thereby enabling to determine presence of a foreign object.

The tracking module 104C actually operates to generate a track function corresponding to the path/orientation of the grouped points' locations. The track function is defined such as to overcome the spatiotemporal statistical behavior of the waves, currents and ripples, which may obscure intermittently small objects (e.g., swimmers, buoys, debris) in the water or whereby such objects occasionally sink below the water surface before rising again to the surface. More specifically, the tracking module is preprogrammed to successively apply two levels of tracking algorithms to the grouping data received from the grouping module. The tracking module determines so-called short term (micro) tracks, and then uses this data to determine long term (macro) tracks. Micro tracks determination comprises spatiotemporally associated plot/path detections corresponding to object tracks that were continuously visibly for a short time period, for example, for the duration of a part or whole of the lifetime of a wave (in cases in which waves intermittently obscure the objects). Macro tracks spatiotemporally associate between the short term micro tracks in overcoming such stochastic behavior of the changing maritime background, as well as objects being intermittently obscured by occasionally sinking below the water surface.

Data processor 100D may further comprise a decision making module 100F configured and operable to receive and analyze the track data TD generated by the tracking module 104C and determine according to predetermined alert conditions whether to issue and alert (e.g., audio/visual) to indicate identification of possible threats in the viewed area of interest. The following are some examples of the use of the above-described surveillance system 100. The same reference numbers are used for identifying functionally common components in all the examples.

Figure 3A:
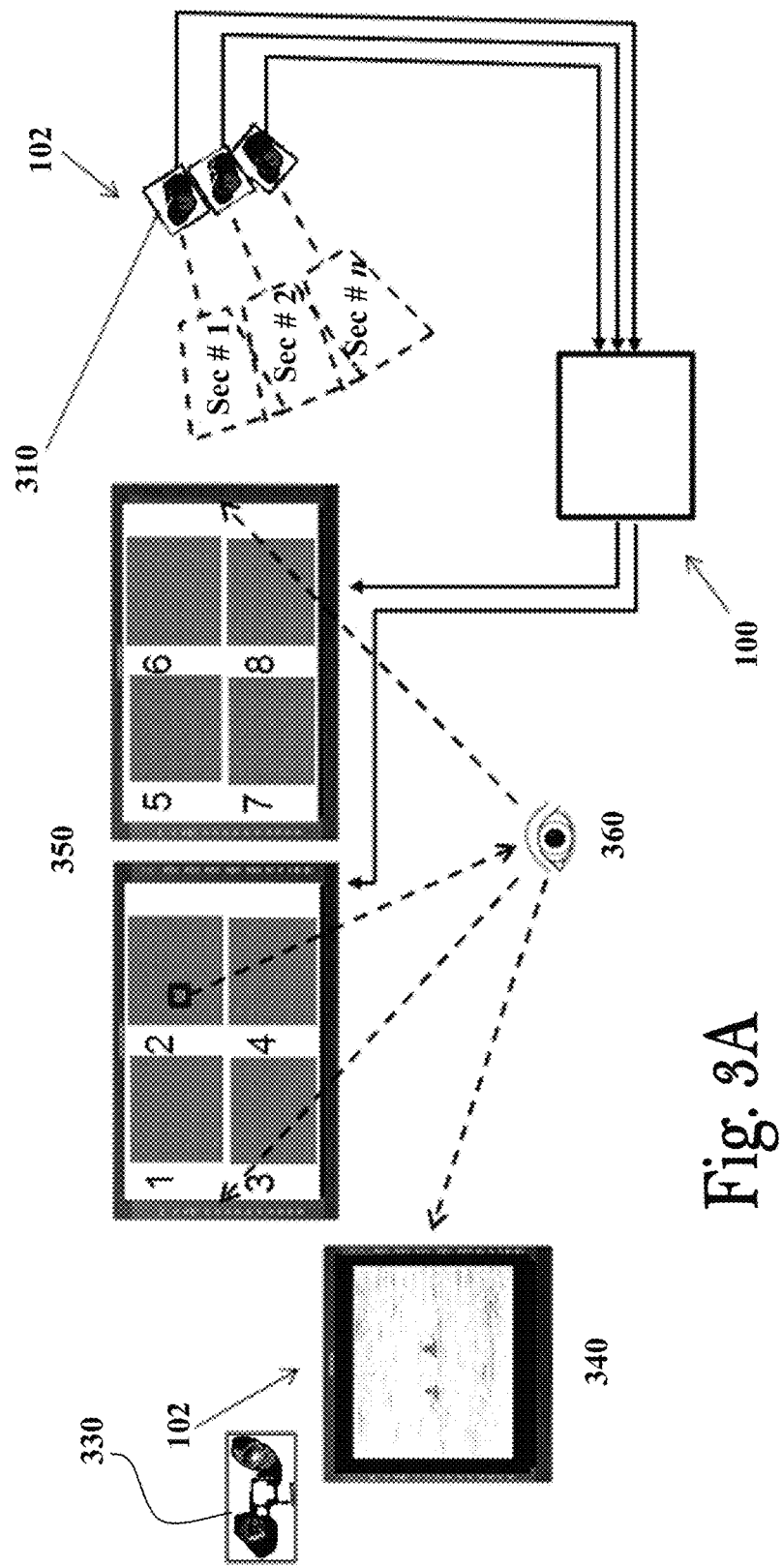

Reference is now made to FIG. 3A schematically illustrating one possible embodiment of a surveillance system 100 associated with an imager 102 having a wide FOR, EO persistent surveillance and monitoring system applicable for maritime security. The surveillance system 100 in this example is connectable to the imaging system 102 including first imaging arrangement 310 comprising multiple, small FOV persistent imagers configured to cover a larger FOR, and a second imaging arrangement 330 comprising a rapid handover PTZ imager for visual investigation of detected threats. Further, in this specific example, the surveillance system 100 is associated with an external display unit 340 for displaying images acquired by the imaging units 310 and/or 330, and a display arrangement 350 comprising a split screen image display for simultaneously displaying all persistent surveillance sectors to an observer/user 360.

FIG. 3B exemplifies another embodiment of a surveillance system 100 associated with an imaging system 102 providing a wide FOR. This exemplary EO persistent surveillance and monitoring system is also applicable for maritime security. In this example, the imaging system 102 includes an imaging arrangement 410 comprising multiple, small FOV persistent imagers configured to cover a larger FOR and installed on a mast unit 415, and an imaging unit 430 comprising a co-located (or remote) rapid handover PTZ imager for visual investigation of detected threats. Also, in this example, the system 100 is associated with a display unit 440 for displaying images acquired by the imaging units 410 and/or 430, that is part of a split screen display unit 450 configured to simultaneously display both the persistent surveillance sectors monitored using imaging arrangement 410 and the investigative images generated by imaging unit 430, and a graphical display unit 460 of the persistently covered sectors optionally also integrated into the display unit 450.

FIG. 3C exemplifies a surveillance system 100 for processing image data from an imaging system having a wide FOR. The imaging system 102 in this example comprises an imaging arrangement 510 comprising multiple, small FOV persistent imagers configured to cover a larger FOR and installed in a suitable enclosure (housing) 515 fixedly attached to a flat surface or structure, and an imaging unit 530 comprising a co-located (or remote) rapid handover PTZ imager for visual investigation of detected threats. Further provided is a graphical user interface unit 525, which is connected to the output utility of the system 100 (interface unit 525 may be an integral part of system 100), and a video combining unit 540 comprising a video quad unit that feeds image display unit 550.

The detection and tracking of objects in maritime backgrounds depends on a variety of varying parameters as a function of object and threat characteristics (e.g., contrast, dimensions, shape, velocity, mass), maritime background (e.g., sea state, wave conditions and characteristics, wind and water flow), environmental conditions (e.g., solar, glint, wind, atmospherics), the type of imagers that are being used (e.g., spectral bands, resolution, sensitivity), platform dynamics (e.g., stationary and moving mast vibrations, vessel motion, inertial motion sensing sensitivity), computing capability of the image analyzer 104A, grouping module 104B, tracking module 104C, and processing unit 100D, display 100E and user interface etc.

FIG. 4A is a block diagram illustrating possible implementation of surveillance system according to some possible embodiments employing an exemplified detect and track processing scheme, designed to overcome the significant variability of maritime scenarios. Block 710 illustrates a possible embodiment of surveillance system 100 configure and operable to perform an image processing technique that comprises the following three main functions: a plot function 720; a track function 730; and a verify function 740.

The plot function unit 720 applies detection algorithms in detecting designated threats and objects with specified characteristics, and generates per-frame detection candidates. Optionally, each such detection candidate comprises a structure of threat data, including a generalized score (likelihood that it is a target) based on signal to clutter, temporal correlation, size, velocity, and suchlike. In this example, the plot function 720 comprises several modules, including noise and artifact removal module 722, a clutter rejection module 724, matched filtering module 726, and adaptive thresholding (e.g., CFAR—constant false alarm rate) module 728.

The track function unit 730 in this example comprises a micro track generator module 732 and a macro track generator module 734, which may be configured to provide an alarm signal. As noted hereinabove, the various modules of the plot and track function units may be implemented by software modules/programs configured to be executed by computerized machines (e.g., comprising one or more processors and memories) and/or by hardware units/modules, or by combinations thereof.

The verify function unit 740 may perform target azimuth/elevation and/or geographic coordinates handover 735 to a verification imager for further target validation.

Figure 4F:
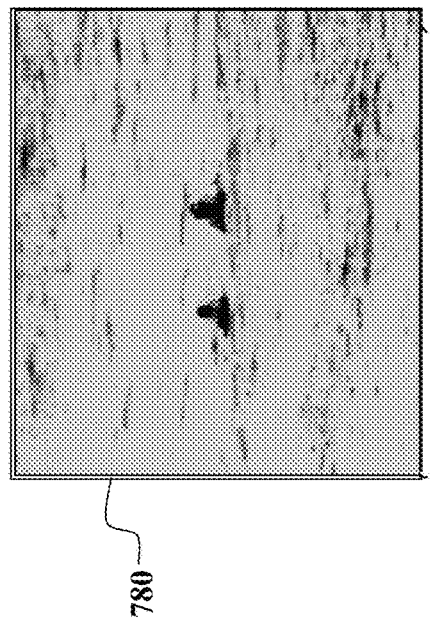
Figure 4E:
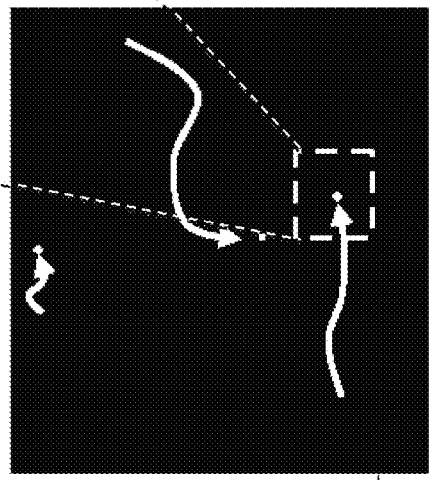
Figure 4C:
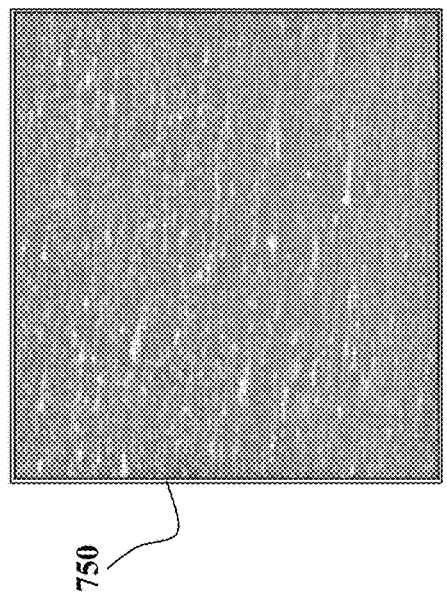
Figure 4D:
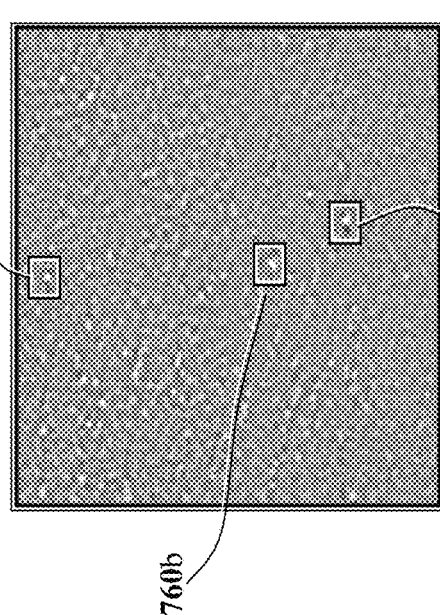

FIG. 4C exemplifies an input image 750 received by surveillance system 710 as part of an image stream data during its operation. Image 750 exemplifies a typical uncooled thermal image of two swimmers and a bad pixel in the FOV. Thermal imagers may be used in such applications for day/night all weather surveillance, monitoring and detect/track performance. Image 760 in FIG. 4D, exemplifies an output of the plot function 720 whereby two swimmers (760a and 760b at the lower center of the image) and a bad pixel (760c at the top of the image) are detected, and fed to the track function unit 730 for associating as new, or with an existing track. Image 770 in FIG. 4E, exemplifies the result of the track function unit 730 with multiple tracks being updated and analyzed, thereby scoring them and generating an alarm, if such track scores exceed a threshold score. Image 780 in FIG. 4F exemplifies a verification image after handover and zooming of the PTZ of verification unit 740. Referring to FIG. 4B, an exemplary processing unit 790 is shown, wherein the plot (720) and track (730) functions have pre-setting provisions 790p enabling adaptation to specific installation constraints (e.g., height of installation above sea level or water surface, ranges, threat characteristics, and suchlike).

FIG. 5A exemplifies the operation of track functionality unit 730 (tracking module 104C), which receives a stream of frame-based plots, from the imaging arrangement 102, such as image 810. In this example image 810 received from the plot unit 720 includes one bad pixel 812 and two swimmers 814 and 816. In this exemplary scenario, the top swimmer 814 is swimming from left to right in breast stroke, and the bottom swimmer unit 816 is swimming from right to left in freestyle stroke.

Referring to FIG. 5B, image 820 demonstrates output of the micro track unit 732, wherein the micro tracks represent associated plot detections, which are sufficiently correlated. Track 822 represents a track resulting from a bad pixel (such bad pixels often occur in cooled and uncooled thermal imagers). The bad pixel (at 822) track is generally spatially stationary, and often appears continuously, or occasionally flickers intermittently. The detection of such bad pixel can also be dependent on the background clutter.

Tracks 824 are short abrupt micro tracks that represent occasional wave ripples that often behave like a swimmer, however for short time periods and space (paths/lengths). Tracks 826 are three micro tracks that appear over time and are relatively correlated for example in space, time and velocity. Such features of the track 826 are typical for breast stroke swimming, as such swimmer is sporadically visible only when his head (and possibly shoulder line) is out of the water as the swimmer advances forward (in this example by swimming from left to right).

Track 828 represents a single long micro track that appears over time and which is more highly correlated, for example in space and time. This is more typical for freestyle stroke swimming, as such swimmer continuously has his head or arm out of the water. Intermittent object or swimmer obscurations can also occur due to increasing wave height. Image 830 in FIG. 5C exemplifies an output of the macro track function unit 734, whereby such micro tracks represent associated plot detections which are sufficiently correlated, as depicted in track 832 which associated successfully the three micro tracks units 826 into a single spatiotemporally correlated macro track. Finally, all macro tracks 832 and 834 are further scored before designated as an alarm.

FIGS. 5D to 5F exemplify a variation of the embodiment exemplified in FIGS. 5A to 5C, whereby the micro tracks are classified and displayed as a function of the degree of dispersion and/or curvilinear features of the plot points about a regression line. In this example, the plot points 912 are almost co-located and are therefore associated to a stationary micro track (e.g., stationary swimmer, buoy, floating debris) and displayed as a circle 922 in image 920, shown in FIG. 5E. The plot points 914 are more dispersed and project onto a regression line in the form of linear vectors designated by the arrowed lines 924 and 926 having updated and accumulated features, such as for example, spatial and/or spatiotemporal end points (from which direction and velocity are computed). The plot points 916 are least dispersed but rather fit well into a smooth curve and therefore may be maintained in their original curvilinear representation as depicted by the arrowed line 928. Such micro track classification can then be used when associating such micro tracks 926 into a single macro track 932, and whereby micro track 928 is associated with itself resulting in macro track 934 (in FIG. 5F), all in terms of spatial and spatiotemporal correlation or overlap analysis.

Figure 6:
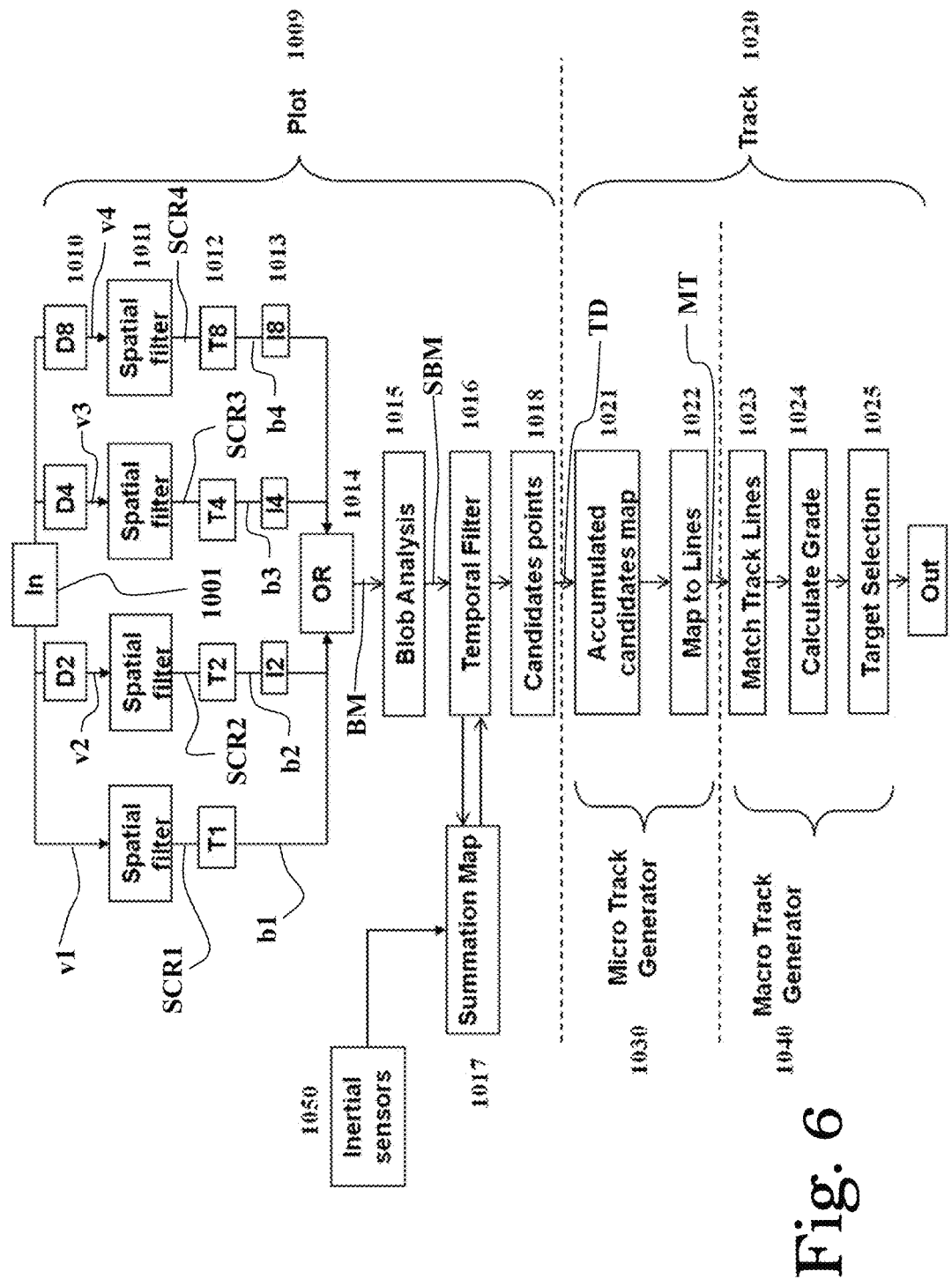
FIG. 6 is a block diagram exemplifying a detect and track processing scheme.

FIG. 6 is a block diagram exemplifying plot and track processing scheme according to some possible embodiments. In this example the plot function unit 1009 generally associated with plot unit 720 (e.g., image analyzer 104A and grouping module 104B), and the track function unit 1020 is generally associated with the track unit 730 (e.g., tracking module 104C).

Plot unit 1009 may comprise the following processing sequences. The input image 1001 is fed into a set of decimation filters units (1010) D2, D4, D8 having respective decimation factors (e.g., ½, ¼, ⅛). The image 1001 is hence de-magnified to several scales, in a possible pyramidal fashion. Additional higher scales may be used when detecting objects of increased dimensions. Scale 1 is the full resolution image. Scale 2 is a decimated image by factor 2, and so on.

The decimated images v1, v2, v3 and v4, are then filtered by respective spatial filter units 1011, which compute a local signal to clutter ratio (SCR) feature for each pixel of each scaled image v1, v2, v3 and v4, and generate data outputs SCR1, SCR2, SCR3 and SCR4 indicative thereof. A possible embodiment for this filtering stage 1011 is a box center-surround operation, as depicted in FIG. 7 and described herein below.

Figure 7:
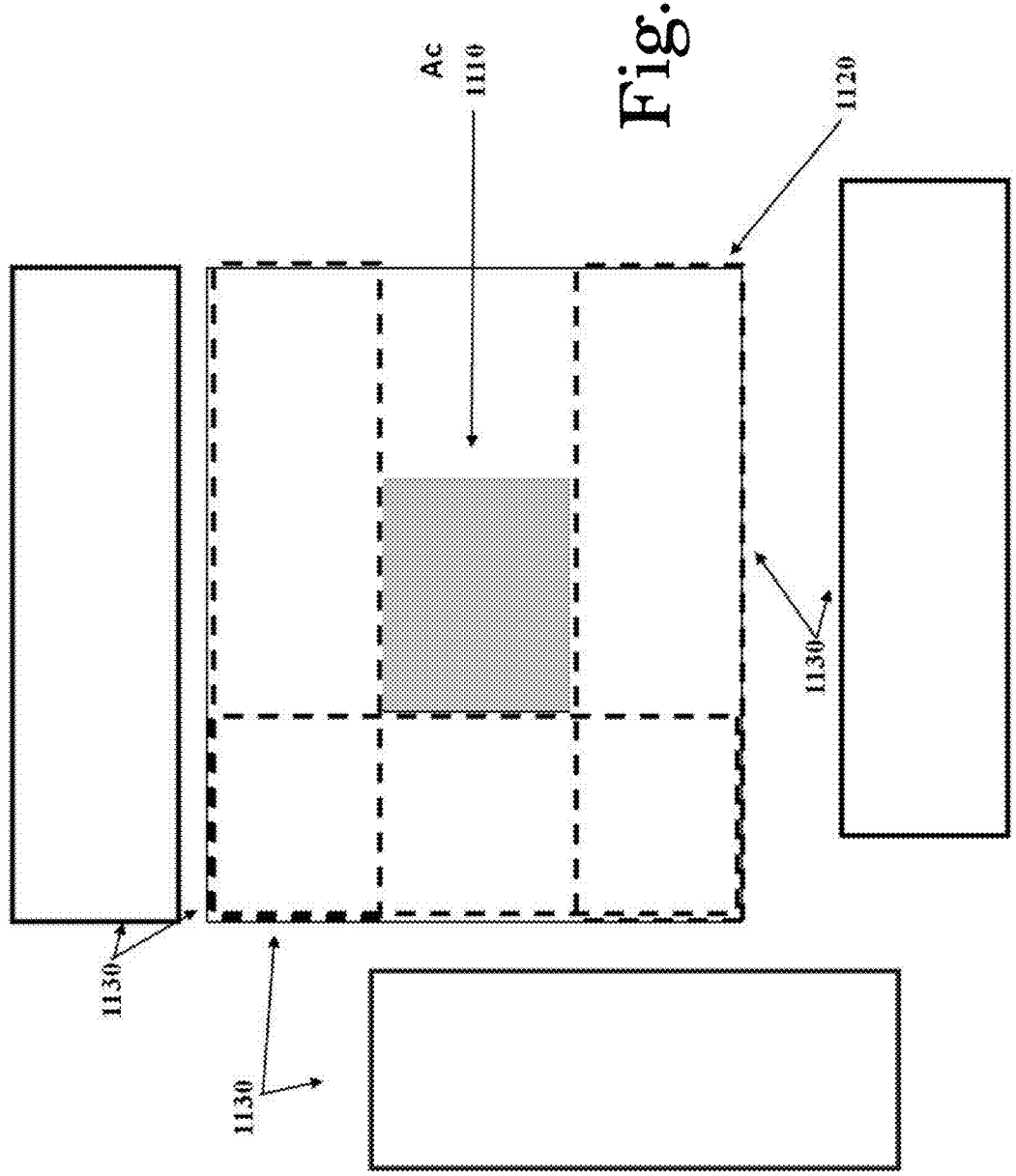
FIG. 7 exemplifies a box center-surround operation according to some possible embodiments.

In the example illustrated in FIG. 7, about each pixel a center window unit 1110 is defined (e.g., 3×3 pixels). The average $A_c$ of the pixels of the window 1110 is then computed (e.g., average of grayscale intensity). Next, a surround window unit 1120 of a larger size (e.g., 9×9 pixels) is defined excluding the pixels of the center window 1110, whereby said larger window 1120 comprises four sub-windows units 1130 (e.g., each having 3×9 pixels). The sub-windows units 1130 are positioned at upper, lower, left, and right, locations relative to the center window 1110, such that they all surround the center window 1110. For each of the sub-windows 1130 the pixel average $A_s$ is computed, and a standard deviation (STD) is estimated/calculating using the following equation:

$$MAD = \frac{1}{N}\sum_{n=1}^{N}|A_s - I_n|$$

where $I_n$ are the pixel values in the respective sub-window.

A local SCR (signal to clutter ratio) measure is then computed using the following equation, and a threshold $SCR_{Threshold}$ level is applied, as follows:

$$SCR_{Threshold} < \left|\frac{A_s - A_c}{MAD}\right|$$

A possible criterion for declaring a suspect pixel at this stage is an event wherein three out the four MAD measures for the four sub-windows 1130 exceed the said threshold $SCR_{Threshold}$ (typical values for such threshold may range between 3 to 5). This makes the spatial filter insensitive to orientation and sensitive to corners.

Referring back to FIG. 6, the filtered output of each scale is then thresholded by units (1012) T1, T2, T3 and T4, whereby different thresholds may be used for each scale. For example, in possible embodiments the thresholds are increased or decreased as the scale increases from 1 to 2 to 4 to 8, depending on whether one seeks more, or less, detection sensitivity for increased size objects. For example, in the case of avoiding the increase of false alarms in higher scales, the following threshold values may be used $SCR_{Threshold}$=T1=4, T2=4.5, T3=5, T4=5.5.

All decimated binary threshold (binary/black and white) image outputs b1, b2, b3 and b4, from threshold units T2, T4 and T8, are then interpolated back to the original resolution by respective interpolating units (1013) I2, I4 and I8, and fed to a logical OR function unit 1014 that combines them all to a single binary map BM.

A spatial blobbing function unit 1015 is then applied to the binary map BM resulting in a segmented blob map SBM. The blobs generally reflect the filled spread of the OR'd plot points, whereby for each blob a geometric center or centroid pixel coordinate $C_{xy}$ and bounding box $BB_{xy}$ is computed.

Said $C_{xy}$ points are fed into an adaptive temporal summing filter 1016 that accumulates in a spatiotemporally fashion such $C_{xy}$ point occurrences. A recursively and adaptively computed summation map is accumulated in unit 1017, and subsequently thresholded and scored by unit 1018 thereby resulting in plot detections.

A possible embodiment of a temporal summing filter is provided below:

$$T_{Threshold} < Sum_{n+1}$$

where $$Sum_{n+1}=[Ib_{n+1}]AND[Max[Sum_n]+1]+[\overline{Ib_{n+1}}]AND[Sum_n \cdot D_{value}]$$

where the $\overline{X}$ operator designates logical inverse operation (i.e., all "0" pixels in $Ib_{n+1}$ are set to "1", and vice versa)

Ib=binary image of $C_{xy}$ pixels n+1=the current frame index

Sum=accumulating summation map

Max[ ]=Maximum value within a given image window $D_{Value}$=score decay coefficient applied to pixels that were not detected in the current frame but have a previously accumulated scores in the summation map $T_{Threshold}$=temporal score threshold beyond which a plot function detection is fed into the track function (ranging typically between ~10-30)

Figure 8:
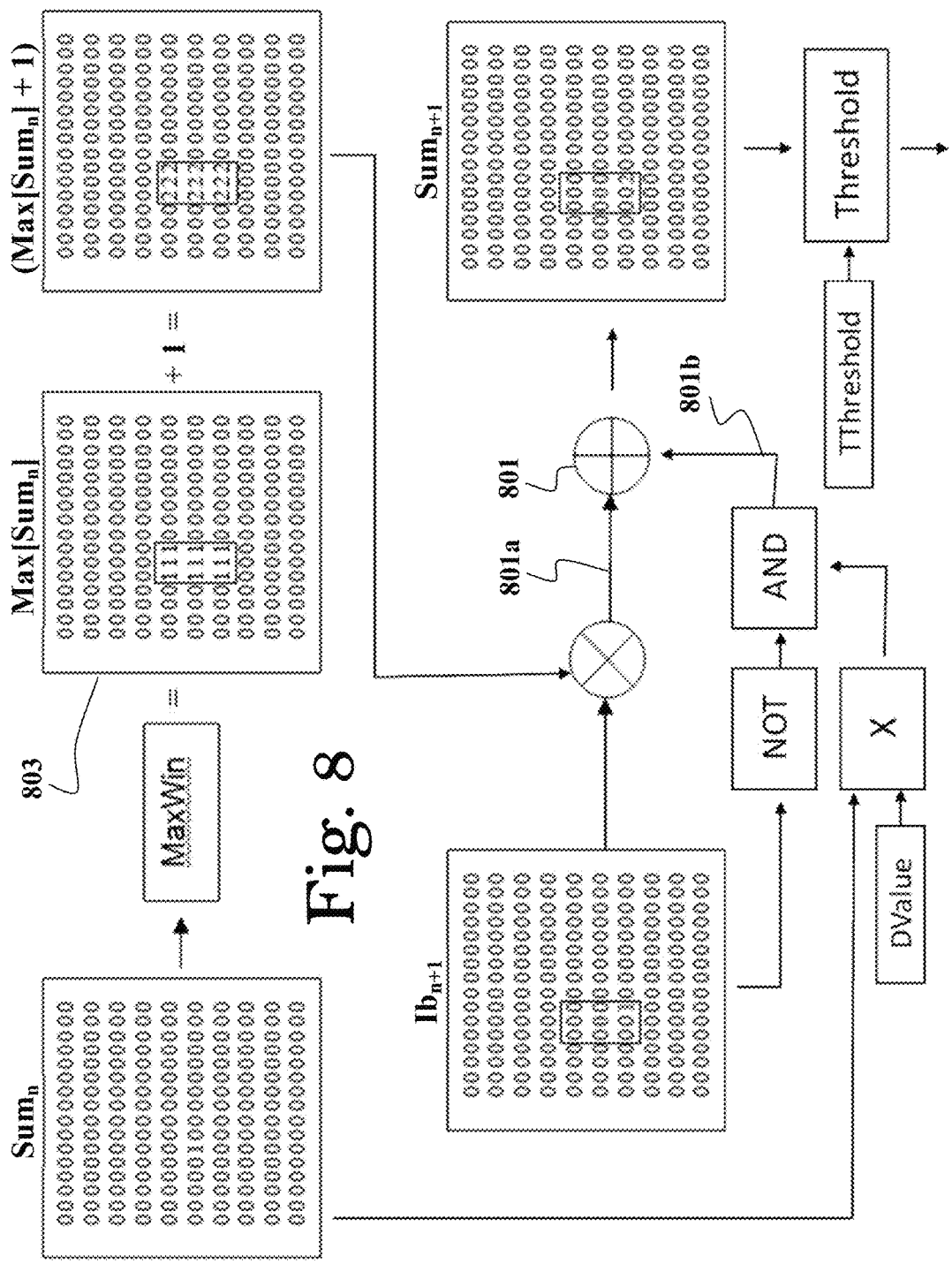
FIG. 8 is a block diagram exemplifying a detection accumulating scheme comprising a function for enhancing detection and reducing false alarms.

The temporal score accumulation equation $Sum_{n+1}$ as depicted in FIG. 8 is the summation (801) results of two terms, 801a and 801b. The first term 801a accumulates the scores of detected points $C_{xy}$, thereby improving the detection sensitivity of points that accumulate over time and space. The second term 801b progressively decays (according to a decaying value DValue[<1]) those accumulated scores of pixels that are not detected in the current frame, thereby reducing false alarms in pixels that such spatiotemporal correlation does not occur.

The window size and shape of the Max[ ] operation 803 determines the spatiotemporal association of scores in the vicinity of currently detected objects and their previously accumulated detection scores. For slow moving objects with respect to the background (e.g., water), the window size may be made small, and for faster moving objects the window size may be increased. Moreover, multiple windows may be used in addressing multiple objects having different velocities, for example a small window for swimmers and a larger sized and shaped window for faster objects such as motorized vessels.

Moving waves and ripples are typical occurrences generating false alarms in the detection process, and higher waves such as swells may also obscure true objects thereby imposing difficulties in the detection process. Moreover, extended objects may generate more than one distinct $C_{xy}$ point, thereby multiple such points may be generated for a given object. Furthermore, such multiple points may move around within the boundary of such extended objects. The result is that one typically receives clouds of such scored points over space and time, and these points are then fed into a track generation process 1020.

An additional factor that affects the detection performance at this stage is the $T_{Threshold}$ value, that is related to the dynamics of the object to be detected and the moving background (e.g., wave dynamics) which may carry the object along as well as obscure it intermittently. Typically, waves and ripples have lifetimes ranging roughly between 2 to 5 seconds, therefore the $T_{Threshold}$ is carefully set to enable detection of objects appearing sporadically in short durations due to such wave obscurations. Objects like swimmers may also go underwater occasionally either purposefully or while swimming typically in breaststroke. The detection performance in such cases strongly depends on the $T_{Threshold}$ and Max[ ] window size as provided above.

Multiple thresholds may be applied in providing additional detection sensitivity in such adverse and sporadically appearing objects. A typical value for $T_{Threshold}$ of ~20 at a frame rate of 25 Hz, implies that consecutive detections over 20 video frames is equivalent to less than one second accumulation, which is well below the lifetime of an obscuring or falsely detected wave.

The thresholded detection output TD of unit 1018 (indicated as candidate points unit in FIG. 6) is also the output the plot function unit 1009.

In another possible embodiment units 1015, 1016, 1017, and 1018 may be incorporated in each decimated processing branch v1, v2, v3, and v4, prior to applying the OR unit 1014. In yet another possible embodiment, a micro track generator unit 1030 is used with each such decimated processing branch prior to applying the OR unit 1014. In yet another possible embodiment a macro track generator unit 1040 is incorporated in each such decimated processing branch prior to applying the OR unit 1014, thereby providing an independent plot-track process for each such decimated processing branch, prior to combining said tracks, at the micro track level or the macro track level, into a combined updated track representation.

In possible embodiments the output TD from the plot function unit 1009 is fed into the track function unit 1020 that comprises the following two sequential units: i) the micro track generator unit 1030; and ii) the macro track generator unit 1040, as depicted in FIG. 6, and described in details hereinbelow.

In possible embodiments micro track generator unit 1030, generally associated with unit 732 in FIG. 4, associates by accumulated candidates map unit 1021 a consecutive set of plot maps over predetermined durations (e.g., ~50 video frames, or at 25 Hz video ~2 seconds) to unify short track vectors (e.g., 826 in FIG. 5B), that represent nominally expected un-obscured objects between recurring wave obscurations, as well as typical timelines for minimal "head over water" durations in breaststroke swimming (in freestyle swimming there is always a part of the body "over water"). These timelines are also typical lifetimes (time durations) of waves with ripples that may be mistakenly detected and tracked at this stage, but will be discarded in the later macro track process (1040) that seeks longer term consistent tracks.

In possible embodiment, accumulated candidates map unit 1021 accumulates detected plot maps over multiple frames (e.g., ~50 frames), applies a Gaussian smoothing to such accumulated points map, and applies a set of morphological operation in generating blobs by differentiating between such correlated clouds of accumulated plot points. The map to lines unit 1022 maps (i.e., fits) each blob to an oriented ellipse, and for each such ellipse the centroid, orientation and bounding box are computed as demonstrated in FIGS. 9A to 9D.

In FIG. 9A, a cloud of plot points 1310 accumulated over a given time duration are shown. Image 1320 exemplifies the cloud of plot points 1310 in FIG. 9A following a blur operation, and image 1330 in FIG. 9C exemplifies a thresholded blob 1331 (i.e., binary black and white image) of the cloud of plot points 1310. As seen, a fitted oriented ellipse 1332 is adjusted over thresholded blob 1331 and a micro track 1333 is accordingly determined with its three marked points of centroid and two endpoints. The coordinates of the centroid point and of the two endpoints are then used in the computations carried out in unit 1340 of FIG. 9D. The output MT of the map to lines unit 1022 is also the output of the micro track generator unit 1030, which is then fed into the subsequent macro track generator unit 1040.

FIG. 9D demonstrates a method for determining the orientation of the fitted oriented ellipse 1332 by calculating the slope of the elongated axis 950 of the ellipse 1332. For example, in some possible embodiments, the slope of the elongated axis 950 may be determined by the extrema points' (x,y) coordinates of the ellipse or the bounding box 952 of the ellipse.

According to one possible embodiment the macro track generator unit 1040 comprises three operations, including a match track lines unit 1023, a calculate grade unit 1024, and a target selection unit 1025.

A preferred embodiment of a match track lines unit 1023 will be now described, relating to events wherein a new micro track MT is generated by unit 1030 with a sufficient time overlap to assure sufficient correlation between subsequent micro tracks while providing sufficient spatiotemporal differentiation, thereby enabling the generation of elongated spatiotemporal macro tracks. Depending on expected object dynamics and motion, an overlap of ~60%-80% is effective, such that for a 50 frame micro track accumulation about 10 frame duration between subsequent micro tracks MTs provides an acceptable tradeoff for swimmers and slow moving objects. Such overlapping micro tracks are represented by their respective time index, centroid, end points, and other computed features (e.g., SCR strength, 2D size), and are associated by the match track lines unit 1023 as demonstrated in FIGS. 10A to 10C.

Referring to FIG. 10A, in this example, arrowed lines 1410 depicts two consecutive micro tracks MTs with good matching between their orientation (<60 degree difference) and distances between their centroids and respective endpoints, whereby in such situation they would be associated to the same macro track. The arrowed lines 1420 in FIG. 10B depicts two consecutive micro tracks with poor matching between their orientation (>60 degree difference) and larger distances between their centroids and respective endpoints, whereby in such situation they would not be associated to the same macro track. In cases that a micro track is not associated with any previous macro track, then a new macro track is automatically generated whereby its first point is that of the new un-associated micro track.

In example 1430 shown in FIG. 10C an elongated macro track (dashed line) 1435 is shown connecting the centroids of previously associated micro tracks. New incoming micro tracks are associated with the most recent micro track MT, and in addition to macro track predictions based on curvilinear features computed for said macro track. For example, point 1431 presents a situation of a head end (i.e., point 1431 is the head end of a long macro track 1435) of a macro track, whereby a macro track prediction area is depicted by dotted circle 1434. FIG. 10C further demonstrates identification of two new micro tracks 1432 and 1433, obtained in the vicinity of such head end 1431, or of the respective predicted area 1434. Micro track 1432 is well matched to the macro track 1435 and is thus associated with it, while micro track 1433 is not well matched, thereby creating a new macro track.

Referring back to FIG. 6, the calculate grade unit 1024 is configured to calculate grades of indexed macro tracks that are accumulated over time, whereby such grades are based on macro track lifetime, track points, accumulated plot point maxima, prediction accuracies, track consistencies, and suchlike. For example, one possible scoring of a macro track is its accumulated lifetime multiplied by the accumulated (or maximal) micro track grades. Based on said accumulated grades, the target selection unit 1025 selects macro tracks, generates a respective alarm, and possibly displays (through output unit 100B and display 100E) and records (e.g., in memory 100C) said alarm and macro track information for an operator/observer for further investigation.

Multiple macro track management over time includes dropping of tracks after a sufficiently long down time, and re-indexing where possible.

In some possible embodiments macro tracks may also be categorized. Bad pixels, typically occurring in (cooled and uncooled) thermal imagers, may be (a) constantly cutoff (black) or saturated (white), (b) sporadically flickering between black and white, (c) sporadically flickering between functional to dysfunctional operation etc. Such bad pixels may well be detected as potential stationary objects in the image. Moreover, their detectability may also be affected by local background behavior. As their spatiotemporal tracks are co-located in said pixel, a specialized process is defined seeking for long term, purely stationary tracks. Slowly (constant or random) drifting objects are also a special case, and can be provided specific parameters for the entire process. The process may also analyze false alarms over the entire field of view, whereby suspect objects that do not have macro tracks, but rather appear often throughout the field of view but repeatedly are scored similarly, can be considered as wave statistics. Fast moving objects may also be defined and processed with specialized parameters.

The performance of embodiments described above may be generally defined by three main parameters. While detection systems performance is generally defined by Probability of detection (PD) and probability of false alarm (PFA) (often PFA is replaced by false alarm rate (FAR)), due to the specific behavior of the maritime backgrounds and the way objects in the water move and become intermittently immersed in water. An additional important parameter that plays a role here is the response time (RT) of the proposed system.

Different objects in maritime environments e.g., swimmers, jet-skis, vessels, buoys, debris, pollution etc. have different dimensions, contrast (visible, thermal), and velocities. For example, swimmers may be characterized by the following features: small size/dimensions, low contrast, low signal to clutter, sporadic obscurations due to waves, immersion in water and slow moving. Larger motorized vessels may be characterized by the following features: larger dimensions, higher contrast, higher signal to clutter, continuously visible due to having larger dimensions than waves, do not go under water, and fast moving.

Accordingly, some of the embodiments may be adapted to account for such characteristics of objects, in a way that different processing schemes (e.g., scripts or threads) may be concurrently applied in parallel for different objects of interest.

For example, in the case of swimmers, as the velocity is typically relatively low, the RT may be extended in achieving sufficiently high PD and low PFA, while for motorized vessels as their velocity is higher, the RT may be shortened while still achieving sufficiently high PD and low PFA.

The combined performance of PD, PFA and RT provides flexibility to the maritime detection system, in terms of addressing the different objects of interest and sea conditions, while complying with performance requirements.

For example, in the case of the elongated virtual fence application described with reference to FIG. 1B, a swimmer may swim across this virtual fence relatively slowly, and due to the swimmer's low contrast one must allow for longer RT in detecting it effectively. Alternatively, a motorized vessel crossing the same virtual fence has larger dimensions, higher contrast and is more easily detectable but the required system RT must be shorter otherwise the object will cross the fence quickly without being detected due to an erroneously allowed longer RT.

Figure 11:
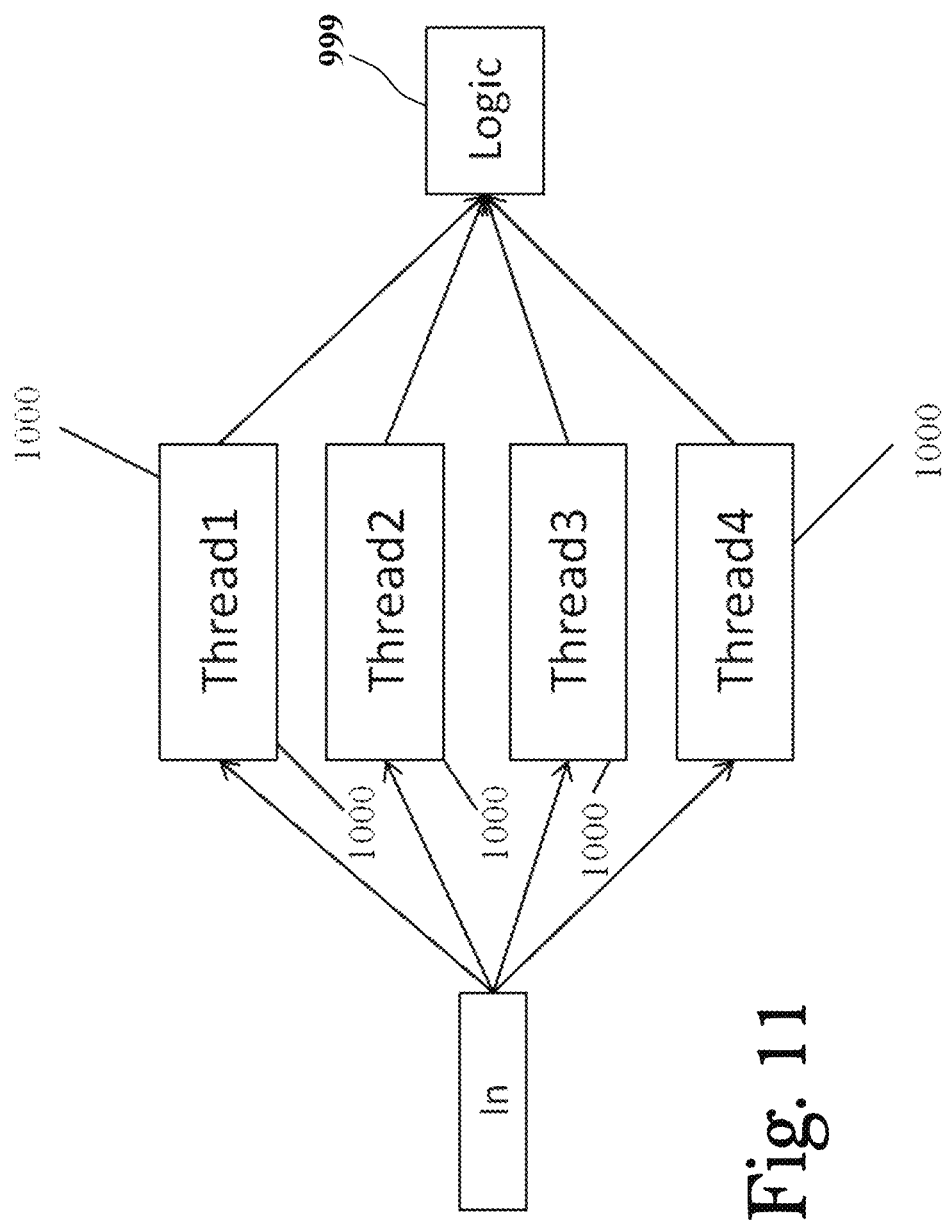
FIG. 11 is a block diagram demonstrating multiple processing threads designed to resolve more specific type of objects/events (e.g., swimmer, buoy, vessel etc), by processing the input video images in parallel, and combining by appropriate logic for the detection of multiple types and dimensions of objects simultaneously.

FIG. 11 exemplifies a possible embodiment employing multiple processing threads 1000. This arrangement is designed for a more specific type of object (e.g., swimmer, buoy, vessel etc), so as to process the input video in parallel, and combine the parallel processed data by appropriate logic 999 in generating detection of multiple types of objects simultaneously.

Further with respect to FIG. 6, for applications which are not based on persistent imaging, such as for example surveillance, monitoring and intruder/threat detection in securing stationary and moving vessels, vessel inertial sensors unit 1050 may be used to feed the summation map unit 1017 and thereby to compensate for the translational and angular motion of the platform between consecutive image frames.

Similar EO inertial surveillance and monitoring may be used for: (a) collision avoidance on maritime navigating vessels in waterside and open sea; (b) stationary and/or inertial surveillance and monitoring for controlling pollution in maritime environments; (c) detecting persons or beacons in rescue operations in maritime environments; (d) vessel situation awareness in emergency and crisis situations in maritime environments, automated image- and data-based situation analysis, including man-over-board, storm, wreckage, spillage etc; and (e) illegal fishing and net usage monitoring.

Collision avoidance of maritime vessels with obstacles such as other vessels or foreign objects in the water may possibly utilize the vessel's inertial sensors 1050 in computing time to collision with such detected and tracked objects.

Embodiments described herein may be used in applications for the control of maritime pollution, whereby such detection of pollution effects may be achieved using vessel-born imagers as well as airborne and space borne commercial platforms. Two examples of such airborne imaging and detections of oil spill pollution are depicted in FIGS. 12A to 12D. Image 1610 in FIG. 12A depicts an oil spill 1611 from a drilling rig. FIG. 12B shows an automatically detected (white area 1621) in image 1620, Image 1630 in FIG. 12C depicts a combined oil spill and smoking fire from a drilling rig 1633, and image 1640 in FIG. 12D depicts the automated detection (white area 1635) of both polluting effects whereby the oil spill and the fire and smoke are detected without differentiation.

Embodiments described herein may be also used in rescue operations in maritime environments, whereby such detection of persons in the water may be achieved using vessel-born imagers, ground based imagers and air airborne imagers. When using beacons such as specialized flashing light sources, the process of embodiments described herein can be tuned to said beacons. Beacons placed on buoys, and may also be used in automatically detecting said buoys for navigation purposes in riverways, tight waterways etc.

A maritime "black box" may incorporate one or more of the above-described embodiments, whereby a panoramic 360 degree camera may be placed on top of a vessel's mast facing downwards, thereby providing a peripheral continuous image of the vessel's rail, so as to enable the detection of man-over-board and objects in the water in the vicinity of the vessel. An additional application for such "black box" is the detection of fishing nets and cranes protruding from the ship's boundary line thereby enabling the monitoring of illegal fishing possibly correlated with the measured location of the vessel, for example using a GPS. An example of such mast mounted imager is depicted in FIGS. 13A and 13B, whereby two such wide FOV cameras can provide full peripheral coverage of the vessel 1725 from a top view and its maritime surrounds, thereby enabling detection of overboard objects, debris, protruding fishing net cranes, spillage, wreckage etc. Image 1710 in FIG. 13A depicts a visible daytime camera view, and image 1720 in FIG. 13B depicts a thermal imaging camera view that can provide day/night observation, with increased sensitivity to hot objects, such as body temperature of persons etc.

Some exemplary applications of the embodiments described herein are discussed herebelow:

Maritime Security Persistent Surveillance and Monitoring for Securing Stationary Installations:

In this application, electro-optic (EO) persistent surveillance, monitoring and intruder/threat detection in securing waterside and open sea stationary installations, are based on the following principles:

(a) Persistent (day/night) surveillance of multiple maritime sectors utilizing various imagers (e.g., infrared (IR) staring cooled or uncooled thermal band, near infrared (NIR) band, visible band (VIS), and combinations thereof) and split screen displays, (b) Reduced operator/crew workload utilizing automated image/video processing for intrusion detection/tracking/alarm of threats, based on some embodiments of this application, (c) Rapid handover of detected threats to a pan tilt zoom (PTZ) imager for visual verification.

Maritime Security Inertial Surveillance and Monitoring for Securing Vessels:

EO inertial surveillance, monitoring and intruder/threat detection system in securing stationary and moving vessels, are based on the following principles:

(a) Inertial (day/night) surveillance of multiple maritime sectors utilizing various imagers (e.g., infrared (IR) staring cooled or uncooled thermal band, near infrared (NIR) band, visible band (VIS), and combinations thereof) and split screen displays, (b) Reduced operator/crew workload utilizing automated intruder/threat detection/tracking/alarm and correlation with vessel navigational sensors, based on some embodiments of this application, (c) Rapid handover of detected threats to a PTZ imager for visual verification.

Maritime Safety Surveillance and Monitoring for Securing Vessels Against Collisions:

EO inertial surveillance and monitoring for collision avoidance on maritime navigating vessels in waterside and open sea, based on the following principles:

(a) Inertial (day/night) surveillance of multiple maritime sectors utilizing various imagers (e.g., infrared (IR) staring cooled or uncooled thermal band, near infrared (NIR) band, visible band (VIS), and combinations thereof) and split screen displays, (b) Reduced operator/crew workload utilizing automated obstacle detection/tracking/alarm and correlation with vessel navigational sensors, based on some embodiments of this application, (c) Rapid handover of detected obstacles to a PTZ imager for visual verification.

Maritime Environmental Surveillance and Monitoring for Controlling Pollution:

EO stationary and/or inertial surveillance and monitoring for controlling pollution in maritime environments, based on the following principles:

(a) Persistent and/or inertial (day/night) surveillance of multiple maritime sectors various imagers (e.g., infrared (IR) staring cooled or uncooled thermal band, near infrared (NIR) band, visible band (VIS), and combinations thereof) and split screen displays, (b) Reduced operator/crew workload utilizing automated pollution detection/tracking/alarm, based on some embodiments of this application, (c) Rapid handover of detected obstacles to a PTZ imager for visual verification.

Maritime Surveillance and Monitoring for Rescue Operations:

EO stationary and inertial surveillance and monitoring for detecting persons or beacons in rescue operations in maritime environments, based on the following principles:

(a) Stationary and inertial (day/night) surveillance of multiple maritime sectors various imagers (e.g., infrared (IR) staring cooled or uncooled thermal band, near infrared (NIR) band, visible band (VIS), and combinations thereof) and split screen displays, (b) Reduced operator/crew workload utilizing automated persons/beacons detection/tracking/alarm and correlation with platform navigational sensors, based on some embodiments of this application, (c) Rapid handover of detected obstacles to a PTZ imager for visual verification.

Maritime Emergency ("Black Box") Surveillance and Monitoring for Vessels:

EO inertial surveillance and monitoring for vessel situation awareness in emergency and crisis situations in maritime environments, based on the following principles:

(a) Inertial (day/night) surveillance of multiple maritime sectors utilizing various imagers (e.g., infrared (IR) staring cooled or uncooled thermal band, near infrared (NIR) band, visible band (VIS), and combinations thereof) and split screen displays, (b) Detecting emergency situations, recording and alarming based on automated image- and data-based situation analysis, including man-over-board, storm, wreckage, spillage etc, based on some embodiments of this application, (c) Such analysis and recording may also include illegal fishing and net usage monitoring, for example.

The invention claimed is:
1. A method for detecting foreign objects in a region of interest in a maritime environment, the method comprising:
   receiving image data indicative of a sequence of successively acquired images of the region of interest, analyzing each image in said sequence of images to determine candidate image pixel points of interest in the generated data indicative of the interpolated image data;

processing the generated data indicative of the candidate image pixel points in the image data
identifying the candidate image pixel points having adjacently located coordinates in two or more of the consecutive images, and
generating grouping data indicative of a plurality of groups of said adjacently located candidate image pixel points; and
processing the grouping data,
said processing the grouping data comprising
identifying spatio-temporal correlation between the adjacently located image pixel points in each group of candidate points for determining for at least some of said groups of candidate points micro tracks formed by the locations of the grouped points in the two or more consecutive images and being indicative of formation of short term tracks in the received images, and
generating micro tracks data indicative thereof,
wherein said analyzing of the sequence of images comprises:
applying to each image under analysis of the sequence of images one or more decimation functions and generating respective decimated image data;
computing a signal to clutter ratio for each pixel in said image under analysis and for each pixel in said decimated image data;
processing the generated signal to clutter ratios and
generating therefrom one or more respective binary image data
for said image under analysis, and
for said respective decimated image data according to an adaptive thresholding criterion; and
interpolating binary image data associated with said decimated image data, and generating data indicative of interpolated image data.

2. The method of claim 1, wherein said generation of the data indicative of the interpolated image data further comprises applying an OR logic function to the binary image data obtained for the analyzed image and for the interpolated binary images associated with decimated image data.

3. The method of claim 1, wherein said generation of the decimated image data comprises applying to each image two or more of the decimation functions having different decimation factors, said decimated image data thereby comprising two or more respective decimated image data pieces.

4. The method of claim 1, comprising carrying out the following operations:
applying spatial blobbing function to the data indicative of the interpolated image data thereby obtaining segmented blob maps comprising blob data associated with points appearing in the image;
filtering the segmented blob maps and generating respective spatiotemporal geometric centers for each blob in said maps, said geometric centers corresponding to the candidate points; and
generating binary images indicative of said spatiotemporal geometric centers.

5. The method of claim 4, wherein said operations are applied to the binary image data associated with the analyzed image and with the interpolated image data resulting from said interpolation of the binary images associated with said decimated image data.

6. The method of claim 4, wherein said operations are applied to the data resulting from the application of the OR logic function.

7. The method of claim 4, comprising generating the micro tracks by carrying out the following operations:
identifying the groups of adjacently located spatiotemporal geometric centers; applying a smoothing function to said groups of adjacently located spatiotemporal geometric centers and morphological operators to generate respective blobs; and
mapping each blob to an oriented ellipse and determining slope and length of an elongated axis thereof and generating the micro track data accordingly.

8. The method of claim 7, comprising correlating the micro track data obtained for the different blobs to determine the continuous paths and generating the macro track data indicative thereof.

9. A computerized system for use in detecting foreign objects in a region of interest in maritime environments, the system comprising:
data input utility for receiving image data of two or more images successively acquired from said region of interest, said images having a cluttered background;
one or more processors and memory configured and operable to receive and analyze said image data using one or more modules stored in said memory, comprising:
a plot detection module for identifying one or more groups of candidate image pixel points adjacently located in regions in the interpolated binary images of said two or more images and generating data indicative thereof; and
a track detection module comprising:
a micro track detection unit configured and operable to
determine for at least some of said groups of candidate points micro tracks
formed by the locations of the grouped points in the two or more successively acquired images and
being indicative of formation of short term tracks in the received images, and
generate micro tracks data indicative thereof, and
a macro track detection unit configured and operable to
determine correlations between at least some of the micro tracks for
determining from the locations of said one or more groups of candidate image pixel points in the images
continuous paths of foreign objects by
combining the at least some of the micro tracks to thereby overcome intermittent obstruction of the foreign objects due to significant variability of the maritime environment and
enable generating track data accordingly;
wherein the plot detection module comprises:
a decimation utility for
decimating the received image data and
generating respective decimated image data;
a spatial filter utility for
determining a signal to clutter ratio for each pixel in the image data under analysis and for each pixel in the decimated image data, and
generating pixel data indicative thereof;
a threshold utility for generating binary images for said image data under analysis and said decimated image data based on said pixel data and an adaptive threshold criterion; and an interpolation utility for interpolating binary images associated with said decimated image data.

10. The system of claim 9, wherein the plot detection module comprises OR function utility for applying an OR logic function to the binary image data associated with the analyzed image data and the interpolated binary images, and generating data indicative thereof.

11. The system of claim 9, wherein the plot detection module comprises:
- a blob analysis utility configured and operable for processing the binary image data, or the data obtained from the OR function utility, and generating blob maps comprising blob data associated with image pixel points in the received images;
- an adaptive temporal filtering summing utility configured and operable for filtering the blob maps and generating respective spatiotemporal geometric centers for each blob in said maps; and
- a plot identification utility configured and operable for identifying the candidate image pixel points based on the generated geometric centers.

* * * * *